United States Patent
Elgali et al.

(10) Patent No.: US 11,890,816 B2
(45) Date of Patent: Feb. 6, 2024

(54) SYSTEM AND METHOD OF MITIGATING COLOR OFFSET DISCREPANCIES IN 3D PRINTING SYSTEMS

(71) Applicant: STRATASYS LTD., Rehovot (IL)

(72) Inventors: Lior Elgali, Tel-Aviv (IL); Dror Kasimov, Tel-Aviv (IL); Yoav Bressler, Tel-Aviv (IL); Shai Lipowitch, Petach Tikva (IL)

(73) Assignee: STRATASYS LTD., Rehovot (IL)

( * ) Notice: Subject to any disclaimer, the term of this patent is extended or adjusted under 35 U.S.C. 154(b) by 566 days.

(21) Appl. No.: 17/264,043

(22) PCT Filed: Jul. 30, 2019

(86) PCT No.: PCT/IL2019/050860
§ 371 (c)(1),
(2) Date: Jan. 28, 2021

(87) PCT Pub. No.: WO2020/026240
PCT Pub. Date: Feb. 6, 2020

(65) Prior Publication Data
US 2021/0370610 A1   Dec. 2, 2021

Related U.S. Application Data

(60) Provisional application No. 62/860,564, filed on Jun. 12, 2019, provisional application No. 62/760,949, (Continued)

(51) Int. Cl.
*B29C 64/393* (2017.01)
*B29C 64/336* (2017.01)
(Continued)

(52) U.S. Cl.
CPC .......... *B29C 64/393* (2017.08); *B29C 64/336* (2017.08); *H04N 1/60* (2013.01);
(Continued)

(58) Field of Classification Search
CPC ..... B29C 64/336; B29C 64/393; B33Y 10/00; B33Y 50/02; B33Y 70/00; H04N 1/36; H04N 1/60
(Continued)

(56) References Cited

U.S. PATENT DOCUMENTS 6,853,464 B1 * 2/2005 Ueda .................. G03G 15/5062
358/1.9
9,738,033 B2   8/2017 Kritchman
(Continued)

FOREIGN PATENT DOCUMENTS

GB        2541163        2/2017
WO   WO 2015/178443   11/2015
(Continued)

OTHER PUBLICATIONS

Pei-Li Sun et al; Color Uniformity Improvement for an Inkjet Color 3D printing system; Electronic Imaging; vol. 2016; No. 20; Feb. 14, 2016.
(Continued)

*Primary Examiner* — Chun Cao
(74) *Attorney, Agent, or Firm* — PEARL COHEN ZEDEK LATZER BARATZ LLP

(57) ABSTRACT

A system and a method of mitigating color discrepancies in three-dimensional (3D) printing systems may including a plurality of printing heads may include: printing one or more samples according to one or more sample parameters; obtaining a color offset vector from the one or more samples; receiving a model representing a 3D object, the model comprising a plurality of model printing points associated with respective color; analyzing the model in view of the obtained color offset vector to produce a calibrated data structure, adapted to mitigate color discrepancies; and printing the 3D object according to the calibrated data structure.

20 Claims, 21 Drawing Sheets

Related U.S. Application Data filed on Nov. 14, 2018, provisional application No. 62/711,889, filed on Jul. 30, 2018.

(51) Int. Cl.
*H04N 1/60* (2006.01)
*B33Y 10/00* (2015.01)
*B33Y 50/02* (2015.01)
*B33Y 70/00* (2020.01)

(52) U.S. Cl.
CPC ............... *B33Y 10/00* (2014.12); *B33Y 50/02* (2014.12); *B33Y 70/00* (2014.12)

(58) Field of Classification Search
USPC .......................................................... 700/98
See application file for complete search history.

(56) References Cited

U.S. PATENT DOCUMENTS

| | | | |
|---|---|---|---|
| 10,065,376 | B2 | 9/2018 | Hakkaku |
| 10,703,040 | B2 | 7/2020 | Nagahari et al. |
| 2004/0046831 | A1* | 3/2004 | Hempel ............... G06K 15/107 347/19 |
| 2006/0250427 | A1 | 11/2006 | Kroon et al. |
| 2008/0007802 | A1 | 1/2008 | Vturro et al. |
| 2010/0021053 | A1* | 1/2010 | Taylor ..................... H04N 1/60 382/162 |
| 2016/0001504 | A1 | 1/2016 | Ikeda et al. |
| 2016/0339643 | A1 | 11/2016 | Dikovsky et al. |
| 2017/0151726 | A1 | 6/2017 | Ikeda et al. |
| 2017/0165919 | A1 | 6/2017 | Ohi et al. |
| 2017/0291373 | A1 | 10/2017 | Hara |
| 2017/0313048 | A1 | 11/2017 | Hakkaku et al. |
| 2018/0104899 | A1 | 4/2018 | Matsubara et al. |
| 2018/0111323 | A1 | 4/2018 | Harayama |
| 2018/0117847 | A1 | 5/2018 | Ohi |
| 2018/0117856 | A1 | 5/2018 | Ochi |
| 2018/0126664 | A1 | 5/2018 | Okawa |
| 2018/0147838 | A1 | 5/2018 | Harayama |
| 2018/0150263 | A1 | 5/2018 | Harayama |
| 2018/0162056 | A1 | 6/2018 | Kaneko et al. |
| 2018/0169936 | A1 | 6/2018 | Harayama |
| 2018/0178444 | A1 | 6/2018 | Hakkaku |
| 2018/0250883 | A1 | 9/2018 | Nagahari et al. |
| 2018/0304546 | A1 | 10/2018 | Hakkaku et al. |
| 2019/0022756 | A1 | 1/2019 | Ohnishi |
| 2019/0043268 | A1 | 2/2019 | Harayama et al. |
| 2019/0270136 | A1 | 9/2019 | Gibson |

FOREIGN PATENT DOCUMENTS

| | | |
|---|---|---|
| WO | WO 2015/199019 | 12/2015 |
| WO | WO 2016/163391 | 10/2016 |
| WO | WO 2016/167239 | 10/2016 |
| WO | WO 2016/167240 | 10/2016 |
| WO | WO 2016/190342 | 12/2016 |
| WO | WO 2017/069245 | 4/2017 |
| WO | WO 2017/147412 | 8/2017 |
| WO | WO 2018/022077 | 2/2018 |
| WO | WO 2019/043696 | 3/2019 |

OTHER PUBLICATIONS

Search Report dated Nov. 25, 2019 for International Patent Application No. PCT/IL2019/050860.

Search Report dated Apr. 20, 2020 for International Patent Application No. PCT/IL2020/050118.

Office Action dated Aug. 25, 2022 for related U.S. Appl. No. 17/618,474.

* cited by examiner

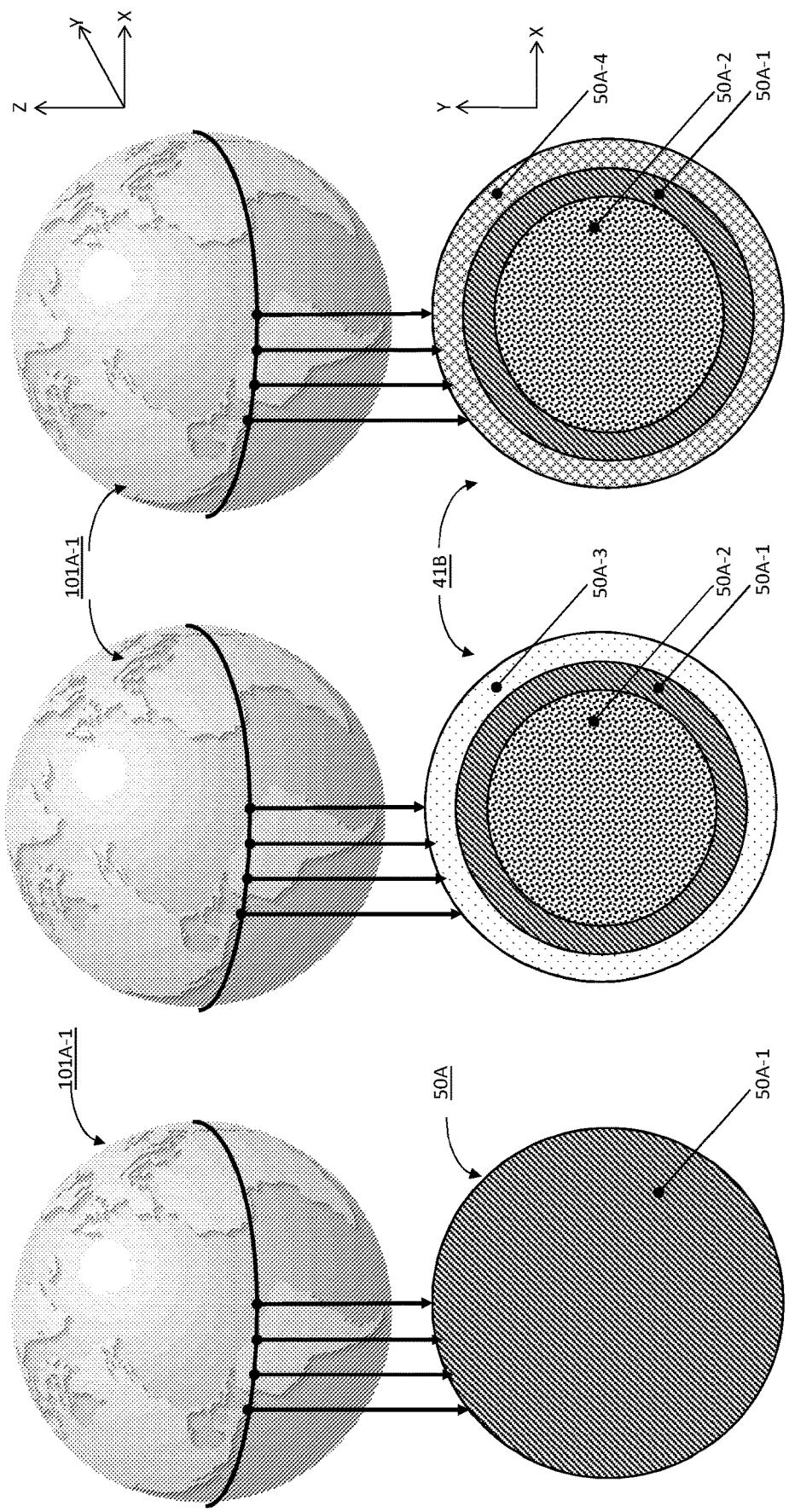

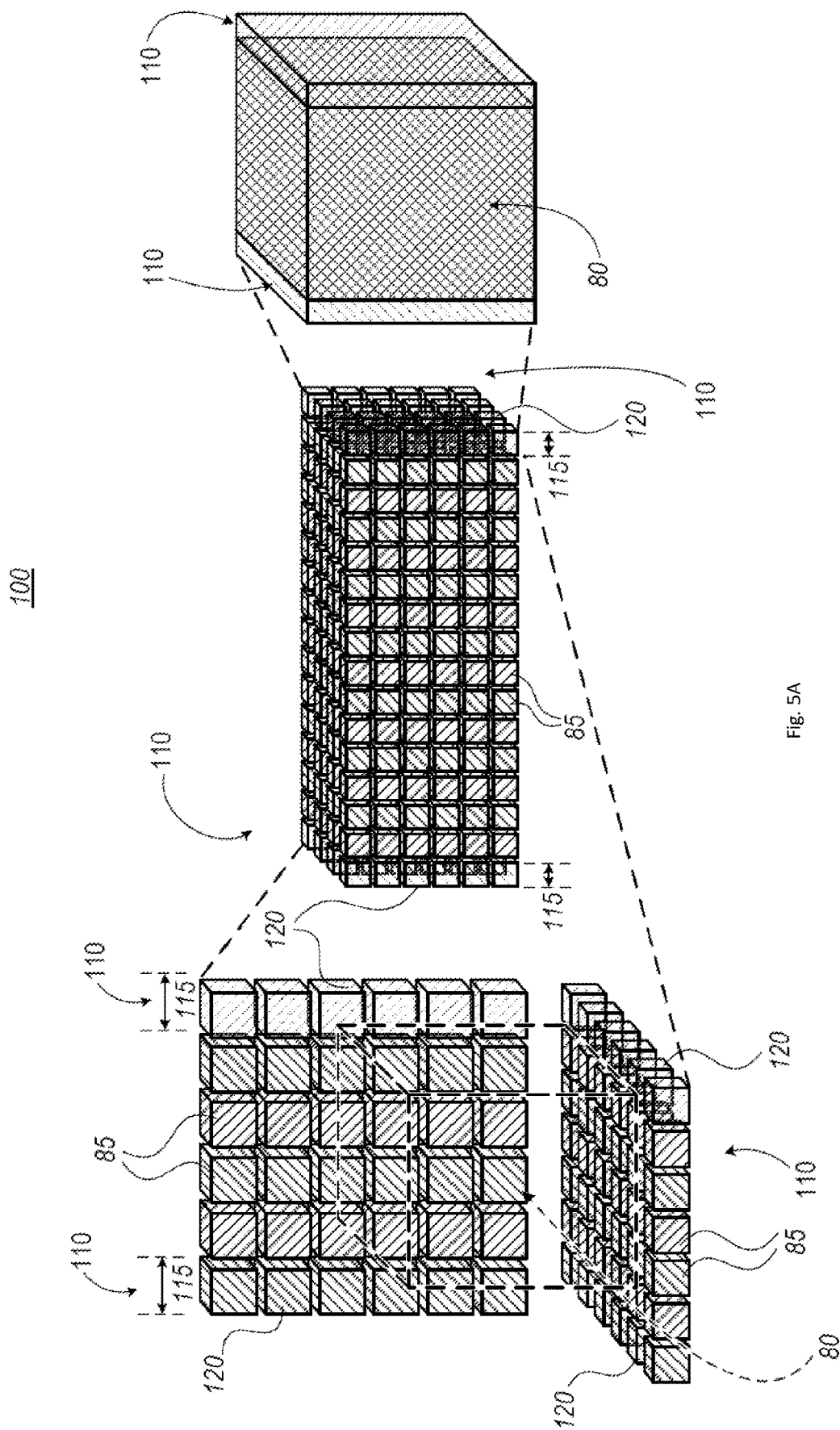

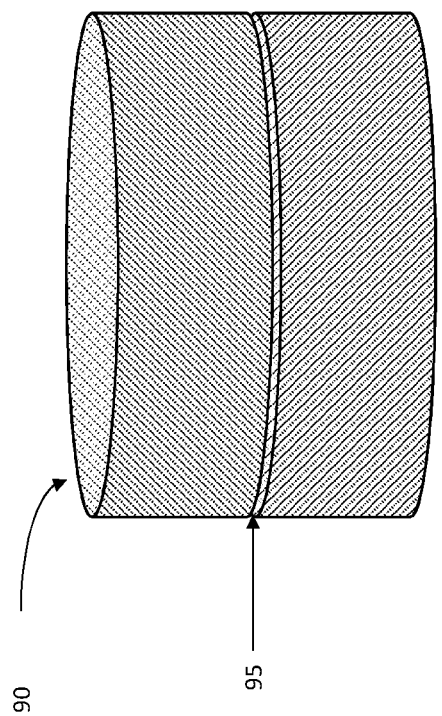
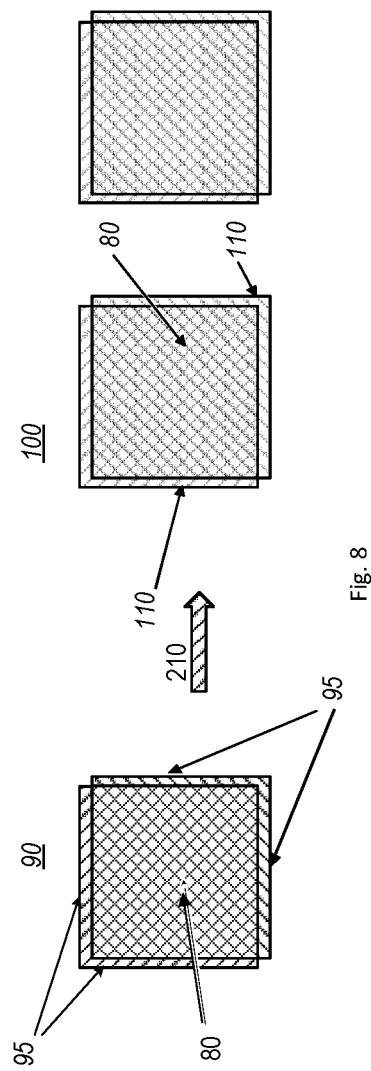
Fig. 7
Fig. 8

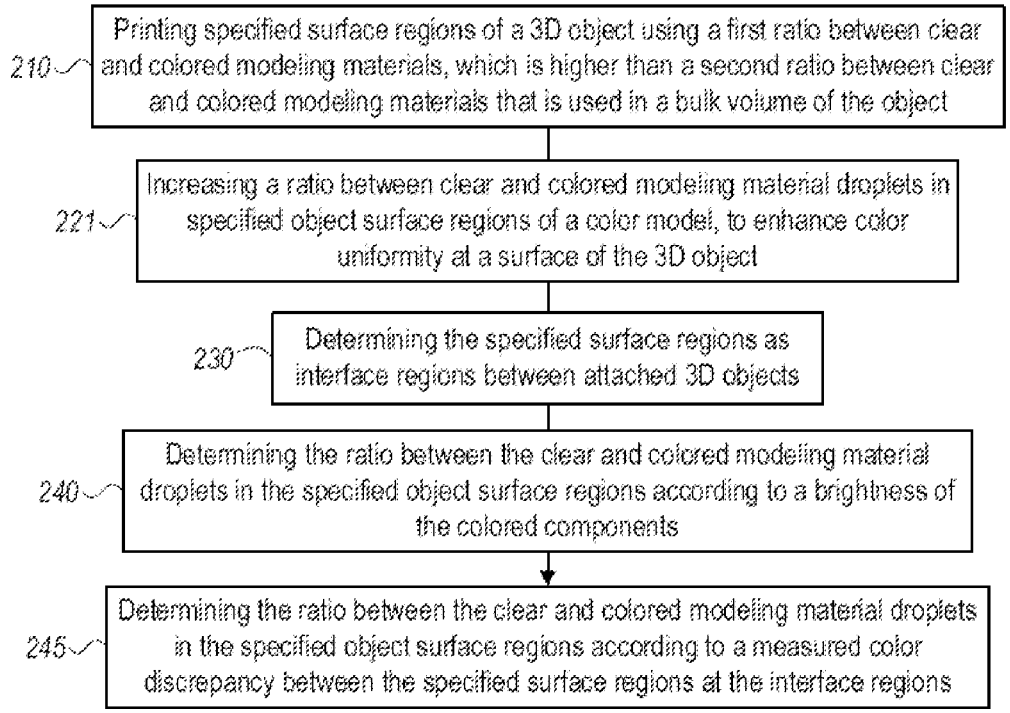
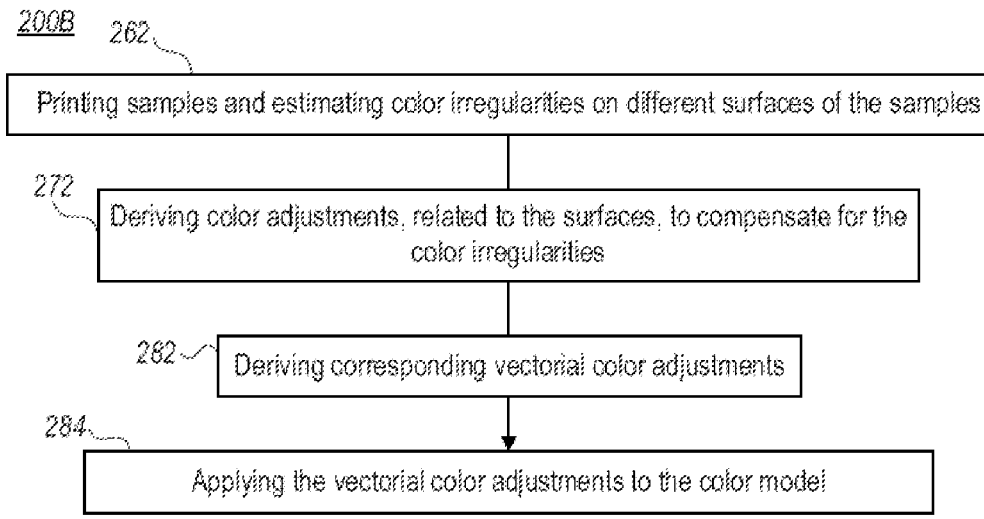
Fig. 10 (continued)

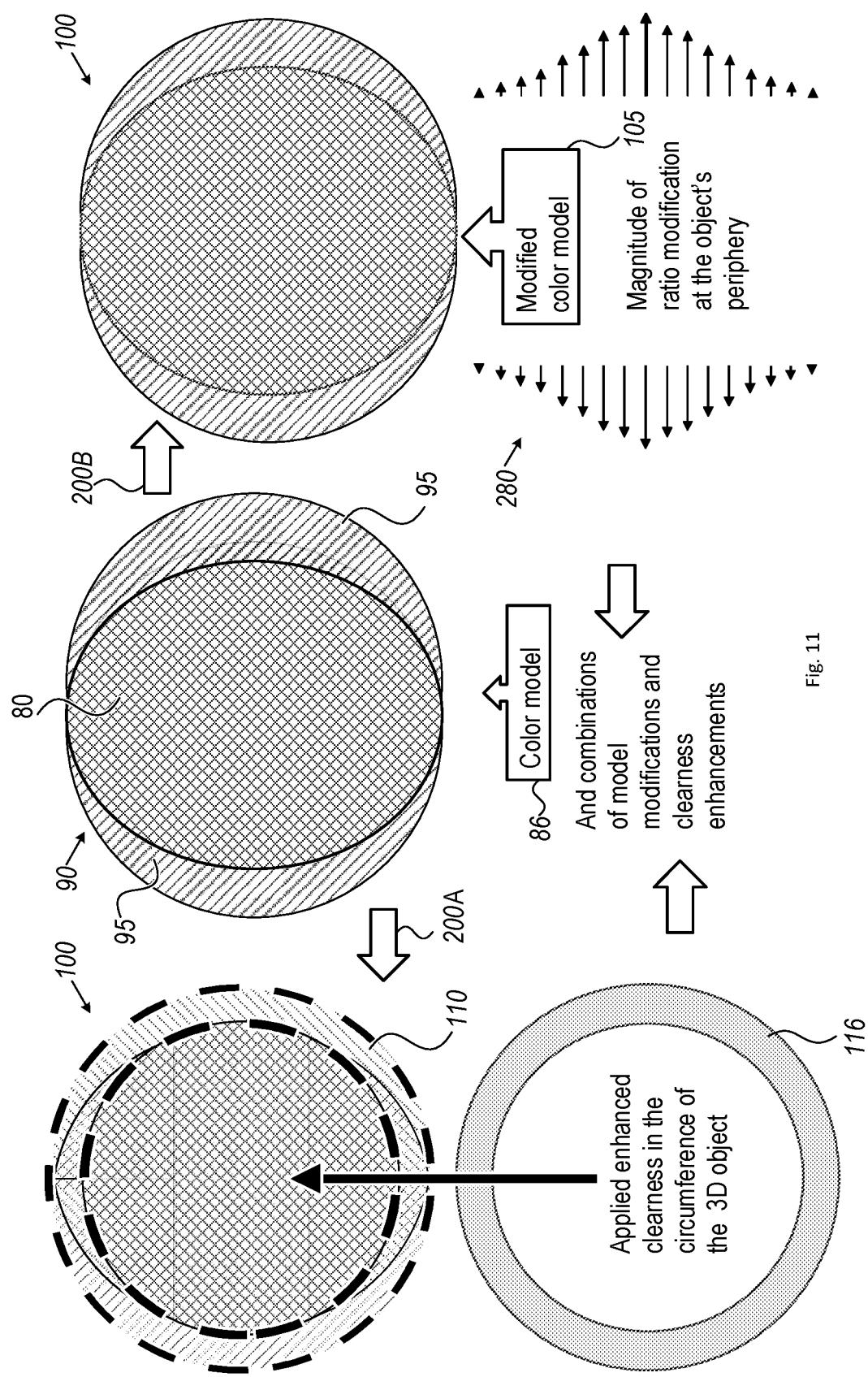

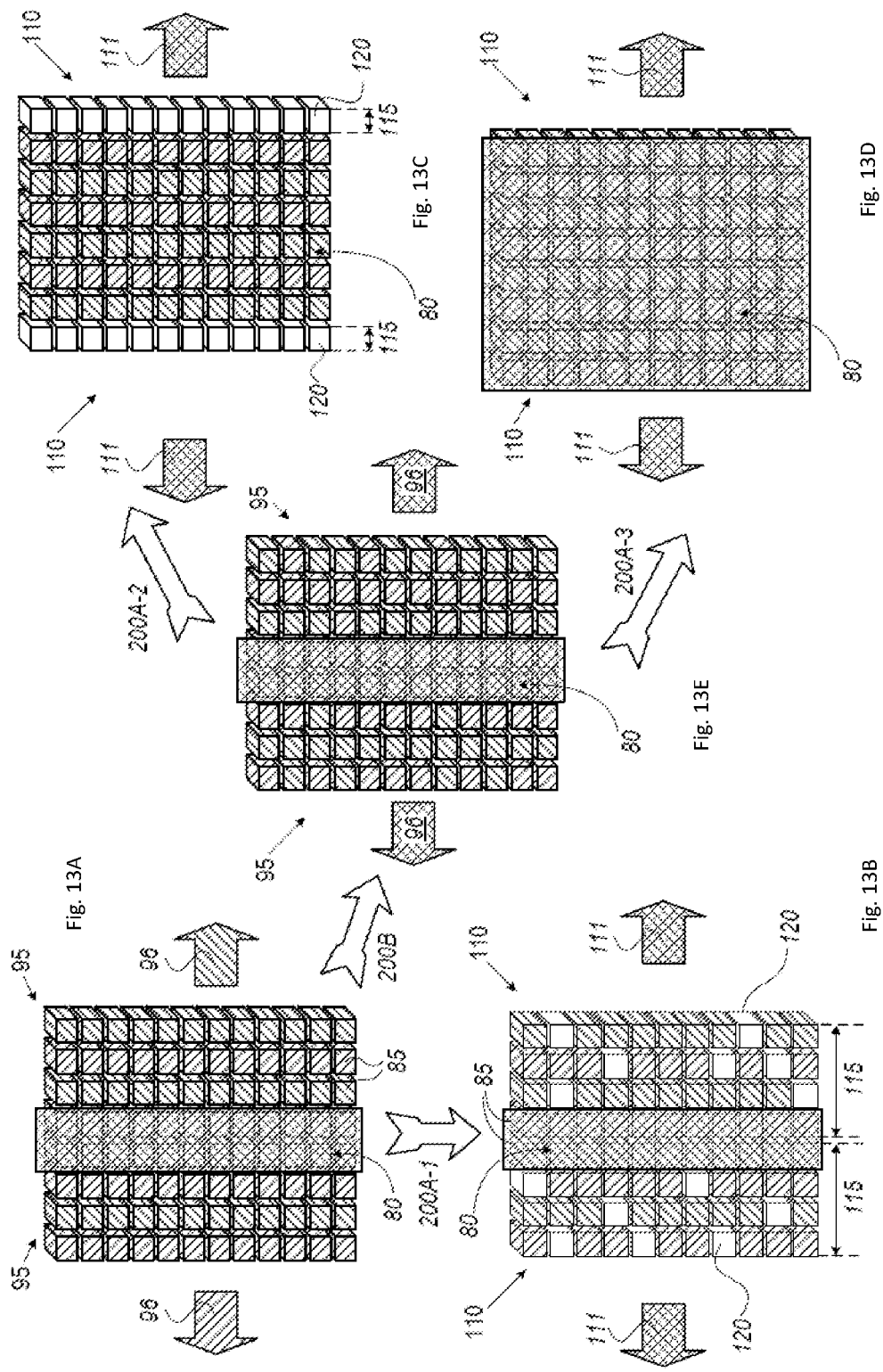

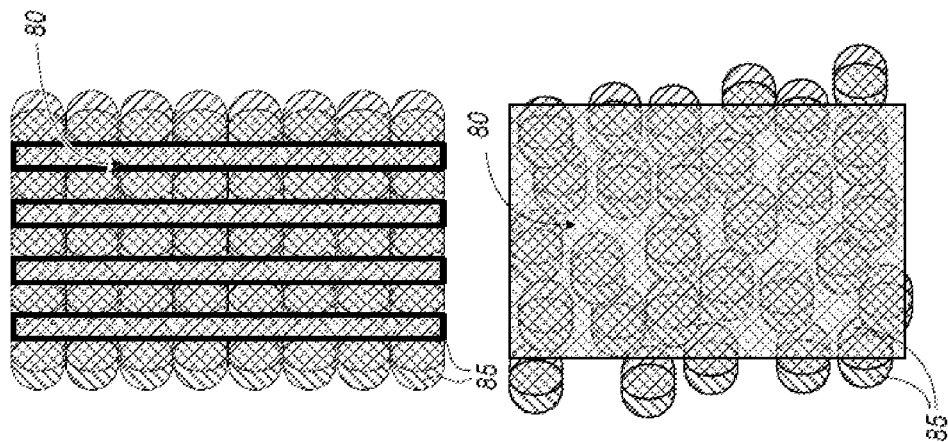
Fig. 15B
Fig. 15C
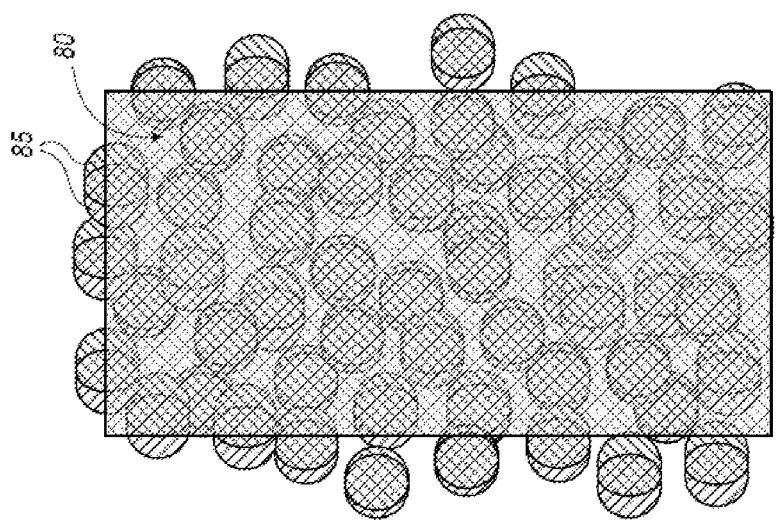
Fig. 15A

SYSTEM AND METHOD OF MITIGATING COLOR OFFSET DISCREPANCIES IN 3D PRINTING SYSTEMS

CROSS-REFERENCE TO RELATED APPLICATIONS

This application is a National Phase Application of PCT International Application No. PCT/IL2019/050860, International Filing Date Jul. 30, 2019, claiming the benefit of U.S. Provisional Patent Application No. 62/711,889, filed Jul. 30, 2018, U.S. Provisional Patent Application No. 62/760,949, filed Nov. 14, 2018, and U.S. Provisional Patent Application No. 62/860,564, filed on Jun. 12, 2019, which are hereby incorporated by reference.

BACKGROUND OF THE INVENTION

Technical Field

The present invention relates to the field of 3D (three dimensional) printing, and more particularly, to mitigating color offset discrepancies in 3D printing systems.

Discussion of Related Art 3D printing is a quickly evolving field of technology, which is becoming applicable to ever more complex objects, including colored objects with simple or intricate color patterns, and requiring ever growing quality.

SUMMARY OF THE INVENTION

The following is a simplified summary providing an initial understanding of the invention.

The summary does not necessarily identify key elements nor limit the scope of the invention, but merely serves as an introduction to the following description.

One aspect of the present invention provides a method of printing a 3D (three dimensional) object layer by layer, the method comprising printing specified surface regions of the 3D object using a first ratio between clear to colored modeling materials, wherein the first ratio may be higher than a second ratio between clear to colored modeling materials used in printing a bulk volume of the object.

One aspect of the present invention provides a method of printing a 3D object from a given CAD color model that specifies a spatial color distribution of modeling material droplets, the method comprising increasing a ratio between droplets of clear to colored modeling materials in specified surface regions of the colored object being printed, to enhance color uniformity at a surface of the final 3D object.

One aspect of the present invention provides a method of canceling color offset irregularities at edges of a 3D object being printed from a given color virtual model that specifies a spatial color distribution for corresponding modeling material droplets, the method comprising modifying, in the given color model, a ratio between droplets of colored modeling materials, at specified surface regions or edges of the 3D object.

One aspect of the present invention provides a method of inkjet-printing a 3D (three dimensional) object layer by layer, the method comprising: printing at least one sample with a plurality of flat surfaces at specified spatial orientations, measuring colors of the flat surfaces, deriving, from the measured colors, color irregularities between the flat surfaces, modifying color parameters of a received CAD color model, used to 3D-print the object, to cancel out the derived color irregularities by applying a vectoral correction of colors specified by the received CAD color model according to spatial relations between normals specified by the received CAD color model and the specified spatial orientations of the flat surfaces, and 3D-printing the object with the modified color parameters.

One aspect of the present invention provides an inkjet-printed 3D object, comprising specified surface regions printed using a first ratio between clear to colored modeling materials, which may be higher than a second ratio between clear to colored modeling materials which may be used in a bulk volume of the 3D object.

One aspect of the present invention provides an inkjet-printed 3D object, comprising at least two parts which may be printed simultaneously and intended to be joined along specified edges to form the 3D object, wherein the parts comprise specified surface regions printed using a first ratio between clear to colored modeling materials, which may be higher than a second ratio between clear to colored modeling materials which may be used in a bulk volume of the parts, and yield a uniform color over and/or between the joined 3D object.

One aspect of the present invention provides an inkjet-printed 3D object, comprising specified surface regions printed from a given color model that specifies a spatial color distribution for corresponding modeling material droplets, wherein the 3D object may be printed from a modified color model having a ratio between colored to clear modeling material droplets at specified surface regions at the edges which compensates for color offsets at the edges by increasing the clear modeling material component.

One aspect of the present invention provides an inkjet-printed 3D object, comprising at least two parts which may be printed simultaneously and intended to be joined along specified edges to form the 3D object, wherein the parts comprise specified surface regions printed from a given color model that specifies a spatial color distribution for corresponding modeling material droplets, wherein the parts may be printed from a modified color model having a ratio between colored and clear modeling material droplets at specified surface regions at the edges which compensates for color offsets at the edges by increasing the clear modeling material component to yield a uniform color over the joined edges of the 3D object.

Embodiments of the present invention may include a method of mitigating, by at least one processor, color discrepancies in a 3D printing system that may include a plurality of printing heads.

Embodiments of the method may include: obtaining a color offset vector from one or more samples; receiving a model representing a 3D object, the model may include a plurality of model printing points associated with respective color; analyzing the model in view of the obtained color offset vector to produce a calibrated data structure, adapted to mitigate color discrepancies; and printing the 3D object according to the calibrated data structure.

According to some embodiments of the invention, producing a calibrated data structure may include defining a transparent envelope region that may include a plurality of printing points associated with a clear printing material, on an external surface of the model.

According to some embodiments of the invention, producing a calibrated data structure may include: calculating a compensated color ratio between two or more colors; and defining a color compensation region. The color compensation region may include a plurality of printing points, associated with the two or more colored materials at the compensated color ratio.

According to some embodiments of the invention, producing a calibrated data structure may include: calculating an enhanced clarity ratio between a clear material and one or more colored materials; and defining a clarity enhancement region. The clarity enhancement region may include a plurality of printing points, associated with one of the clear color and the one or more opaque colors at the enhanced clarity ratio.

According to some embodiments of the invention, producing a calibrated data structure may further include defining a white region that may include a plurality of printing points of white color, in a location adjacent to the clarity enhancement region.

According to some embodiments of the invention, the one or more samples may be printed according to one or more parameters, selected from a list consisting of: a type of the sample, a shape of the sample, an orientation of the sample in relation to axes of a printing grid the of 3D printing system, a pattern of the sample, a type of a 3D printing material used in the sample, a color of one or more 3D printing materials in the sample, a color ratio among two or more printing materials of at least one region of the sample, a clarity ratio between clear printing material and one or more opaque color printing materials of at least one region of the sample and a finishing process of the sample.

According to some embodiments of the invention, producing the calibrated data structure may include modifying the plurality of model printing points to comprise one or more of the transparent envelope region, clarity enhancement region, color compensation region and white region.

According to some embodiments of the invention, the at least one processor may produce a plurality of slice elements, corresponding to planar slices of the 3D object, wherein each slice may include a plurality of slice printing points, and wherein each slice printing point may be associated with a color of the calibrated data structure. The at least one processor may apply, for one or more slice printing points, a dithering algorithm on the calibrated data structure, to obtain a dithered value. The at least one processor may produce a print head selection for one or more slice printing points, based on the dithered value. The at least one processor may propagate or send the print head selection to the 3D printing system, which may in turn print a 3D object according to the print head selection.

According to some embodiments of the invention, at least one sample of the one or more samples may be a 3D sample that may include a plurality of flat surfaces at specified spatial orientations. Additionally, obtaining a color offset vector may include: measuring color of two or more of the plurality of flat surfaces; calculating a color difference between measured colors; and deriving the color offset from the calculated color difference.

According to some embodiments of the invention, at least one sample of the one or more samples may include a pattern of droplets of colored modeling material. Additionally, obtaining a color offset vector may include: measuring a location of one or more droplets of the pattern of droplets; calculating a color droplet misalignment according to the measured locations; and deriving the color offset vector from the calculated droplet misalignment.

According to some embodiments of the invention, calculating the compensated color ratio for one or more printing points of the color compensation region may include: receiving a nominal color ratio; calculating a base color compensation parameter, according to the color offset vector; calculating a projection of a normal to a surface of the model on the color offset vector; and calculating the compensated color ratio as a function of the base color compensation parameter, the nominal color ratio and the calculated projection.

According to some embodiments of the invention, calculating the enhanced clarity ratio for one or more printing points of the clarity enhancement region may include: receiving a nominal clarity ratio; calculating a base clarity enhancement parameter, according to the color offset vector; calculating a projection of a normal to a surface of the model on the color offset vector; and calculating the enhanced clarity ratio as a function of the base clarity enhancement parameter, the nominal clarity ratio and the calculated projection.

(Embodiments of the present invention may include a system for mitigating color discrepancies in a 3D printing machine or system that may include a plurality of printing heads. Embodiments of the system may include: a non-transitory memory device storing instruction code and a processor associated with the memory device and configured to execute the instruction code. Upon execution of the instruction code the processor may be configured to: obtain a color offset vector from one or more samples; receive a model representing a 3D object, the model may include a plurality of model printing points associated with respective color; analyze the model in view of the obtained color offset vector to produce a calibrated data structure, adapted to mitigate color discrepancies; and propagating the calibrated data structure to the 3D printing system so as to print a 3D object according to the calibrated data structure.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 4A is a schematic diagram demonstrating a process of slicing a shell of a 3D object by a system for mitigating color offset discrepancies in 3D printing systems, according to some embodiments;

FIG. 4B, FIG. 4C, FIG. 4D, FIG. 4E and FIG. 4F are schematic diagrams depicting slices of a shell representing a 3D object that may have been modified by an embodiment of the system 10 for mitigating color offset discrepancies in 3D printing systems, according to some embodiments;

FIG. 5A and FIG. 5B are high level schematic illustrations of an inkjet-printed 3D object, according to some embodiments of the invention;

FIG. 7 exemplifies color differences between object edges, when the objects have been printed with two different X-Y orientations on the printing tray;

FIG. 8 is a high level schematic illustration of a modification of a given color model to improve color uniformity at the object edges, according to some embodiments of the invention;

FIG. 11 is a high level schematic illustration of edges color correction methods that are applied separately or simultaneously to improve color uniformity of edges of 3D inkjet-printed objects, according to some embodiments of the invention;

FIG. 13A through FIG. 13E are high level schematic illustrations of multiple approaches for correcting edges color irregularities, according to some embodiments of the invention;

FIG. 15A through FIG. 15C are high level schematic illustrations of multiple approaches to modeling material droplet distributions and corresponding correction of color irregularities, according to some embodiments of the invention;

DETAILED DESCRIPTION OF THE INVENTION

Figure 1:
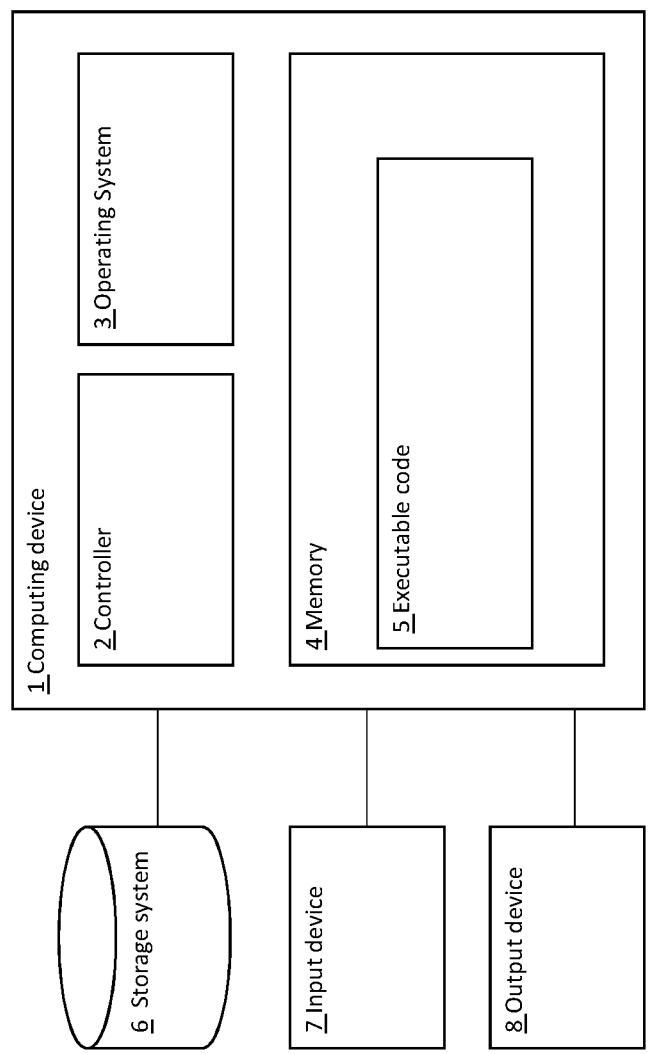
FIG. 1 is a block diagram depicting a computing device, which may be included within an embodiment of a system for mitigating color offset discrepancies in 3D printing systems, according to some embodiments.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

It may be appreciated by a reader of this document and the accompanied drawings that elements of the drawings may have or may be applied specific color and/or opacity. The following legend may be used to indicate color and/or opacity so as to differentiate between elements of the drawings. For example:

a first pattern (e.g., a first slotted pattern ) may represent a volumetric element having a first color (e.g., red);

a second pattern (e.g., a second slotted pattern ) may represent a volumetric element having a second color (e.g., blue);

a third, combined pattern (e.g., a combined crisscross pattern ) may represent a volumetric element having a third color (e.g., purple), that may be a combination of the first color (e.g., red) and second color (e.g., blue);

a fourth pattern (e.g., an empty pattern ) may represent a volumetric element that may have or may be applied a transparent printing material; and a fifth pattern (e.g., a grey-tone pattern ) may represent a volumetric element that may be partially transparent (e.g., less opaque in relation to other volumetric elements listed herein).

Reference is now made to FIG. 1, which is a block diagram depicting a computing device, which may be included within an embodiment of a system for mitigating color offset discrepancies in 3D printing systems, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may mitigate color offset discrepancies in 3D printing systems as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to a 3D model and/or data pertaining to printed samples of 3D modeling material may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Unless specifically stated otherwise, as apparent from the following discussions, it is appreciated that throughout the specification discussions utilizing terms such as "processing", "computing", "calculating", "determining", "enhancing", "deriving" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention provide efficient and economical methods and mechanisms for mitigating color offset discrepancies, to improving the quality of printed three dimensional (3D) objects (e.g., inkjet-printed objects).

Additionally, or alternatively, embodiments of the present invention may provide a system and/or methods that may yield 3D objects without (or with less) color differences or irregularities (e.g., at the printed 3D objects' edges) in comparison with state-of-the-art 3D printing systems.

The following table, Table 1 may be used as a reference for terms that may be used herein.

TABLE 1

| | |
|---|---|
| Modeling material, Printing material, Printing ink | The terms "modeling material", "printing material" and "printing ink" may be used herein interchangeably to refer to a substance that may be dispensed by a print head of a 3D printing system or machine to produce a 3D printed object. |
| Print head, print channel | The terms "print head" and "print channel" may be used herein interchangeably to refer to a hardware component that may be adapted to dispense a specific 3D printing material (e.g., 3D printing ink) at a determined quantity and location of a printing grid of 3D printing machine. For example, a print head may include a dispenser of a printing material of specific color (e.g., cyan), and may be controlled for example by a driver or controller of a 3D printer to dispense the printing material in a specific location in the printing grid. A print head may comprise a single channel for dispensing a single printing material or may comprise more than one channel for dispensing either a single material at a higher resolution or for dispensing distinct printing materials. |

TABLE 1-continued

| | |
|---|---|
| Clear, Colored, Opaque | The term "clear" when used herein in association with a modeling material may refer to a material that is transparent and colorless or minimally colored. In a complementary manner, the terms "colored" and "opaque" may be used herein interchangeably in association with a modeling material to refer to a material that is not transparent (or has a substantially high degree of opacity, e.g. >80% opacity) and may be characterized by a color (including black and white). |
| Colorization vector, Probabilistic colorization vector | The terms "colorization vector" and "probabilistic colorization vector" may be used herein to refer to a vectoral representation of a required color at a specific region of a 3D printed object. The colorization vector may be referred to as probabilistic, in a sense that it may represent a probability of each component to be selected and applied by a print head at any given point of the printed 3D object.<br>For example, a first colorization vector may be a Red Green and Blue (RGB) vector, where the color green may be represented as a combination of RGB components such as: [R, G, B] = [0%, 100%, 0%]. In another example a second colorization vector may be a Cyan, Magenta, Yellow, Black and White (CMYKW) vector, and the color green may be represented as a combination of CMYKW components such as: [C, M, Y, K, W] = [50%, 0%, 50%, 0%, 0%]. In yet another example, a third colorization vector may be a Cyan, Magenta, Yellow, Black, White and Transparent (CMYKWT) vector. A transparent green color may be represented as a combination of CMYKWT components such as: [C, M, Y, K, W, T] = [40%, 0%, 40%, 0%, 20%] |
| LAB colorization vector | The term "LAB colorization vector" may be used herein to refer to a colorization vector including L(lightness), A and B components of colors in the International Commission on Illumination (CIE) LAB color space. As known in the art, the CIE-LAB color space was designed so that a specific amount of numerical change in the values of L, A and B components may approximately correspond to the same specific amount of visually perceived change by a human viewer. |
| Color measurement | The term "color measurement" may be used herein to refer to any type of measurement by an appropriate instrument (e.g., a colorimeter) that may be adapted to produce a measured representation of color (e.g., as a LAB colorization vector) from an object. |
| Color difference (dE) | The term "color difference" may be used herein to refer to a scalar value or entity, indicating a change or difference between two color measurements (e.g., between two different locations or sides of a 3D printed object or sample).<br>For example, as known in the art, a color difference between two representations of color in the LAB color space (e.g., represented as two LAB colorization vectors) may be provided as a scalar value in dE (or $\Delta E$) units. |
| Color discrepancy, Color consistency | The term "color discrepancy" may be used herein to refer to a change or irregularity in a color of a printed 3D object or sample, as may be perceived by a viewer (e.g., a human viewer and/or an instrument adapted to obtain a measurement of color). The term "color consistency" may be used herein to refer to an antonym of color discrepancy, e.g., indicating uniformity of color as may be perceived by the viewer. |
| Color offset, color offset vector | The terms "color offset" and "color offset vector" may be used herein interchangeably to refer to a vectoral value indicating a direction and extent of misalignment between different print heads (e.g., print heads of different color) of a 3D printing system. As elaborated herein, embodiments of the invention may extract or compute a color offset from a sample of printed 3D modeling material and may apply at least one modification on a 3D model so as to mitigate perceived color discrepancies due to the color offset. |
| Clarity ratio, Clarity enhancement | The term "clarity ratio" may be used herein to refer to a ratio of clear printing material to opaque printing material at a region of a printed 3D object.<br>The terms "clarity enhancement" and "clarity enhancement solution" may be used herein interchangeably to refer to a modification or enhancement of the clarity ratio, so as to produce an enhanced clarity ratio, intended to enhance color consistency of a printed 3D object. |
| Color ratio, Color compensation | The term "color ratio" may be used herein to refer to a ratio of a first opaque, colored printing material to one or more second opaque printing material at a region of a printed 3D object.<br>The terms "color compensation" and "color compensation solution" may be used herein interchangeably to refer to a modification of the color ratio so as to produce a compensated color ratio, intended to enhance color consistency of a printed 3D object. |

TABLE 1-continued

| Transparent envelope solution | The term "transparent envelope solution" may be used herein to refer to a modification of a region of a printed 3D object to include a layer or envelope of transparent printing material, intended to enhance color consistency of the printed 3D object. |
| --- | --- |

As known in the art, 3D printing systems may receive a data element or data structure that may be or may include a 3D model, representing an object to be printed. The 3D model may include one or more shells that may define limits or borders of the 3D model or portions thereof. The one or more shells may, for example, be a water-tight polygonal (e.g., triangular) mesh, defined by a plurality of shell points (SP) manifesting geometrical locations in the mesh. For example, the plurality of SPs may include edges, vertices and/or faces of the mesh. One or more (e.g., all) SPs may be associated with a colorization vector (e.g., a probabilistic RGB vector), defining a color at the respective SP.

State-of-the-art 3D printing systems may utilize the information of the probabilistic RGB vector associated with shell points of the 3D model, to select a 3D printing head and apply 3D printing material at respective positions in the printed 3D object. However, state-of-the-art systems of 3D printing may not take into consideration elements of color offset that may, for example, be caused by physical misalignment of print heads during the print head selection process, thus leading to apparent color discrepancy, as explained herein.

As known in the art, color discrepancy on 3D printed objects may be especially detectable (e.g., by a human observer) along edges of the 3D printed objects, and/or along interfaces or attachments of one object with another and/or opposite sides of a uniformly colored object (e.g. left and right sides of a purple cube). Embodiments of the invention may include one or more methods of mitigating perceived color discrepancy on 3D printed objects. These methods may be applied especially (but not limited) to such edge regions, as elaborated herein.

For example, experimental results show that color consistency of a 3D printed object at a surface region may be enhanced by modifying or enhancing a ratio of clear printing material to opaque printing material at the respective region (e.g., the surface region). This modification may be referred to herein as a "clarity enhancement" solution. For example, embodiments may print the respective edge region with a higher or enhanced ratio of clear to colored modeling materials than the object's bulk (e.g., an enhanced clarity ratio), while maintaining the ratio between the different colors of the respective region (e.g., maintaining the color ratio). For example, a colorization of region of a 3D printed object may be defined by a first CMYKWT colorization vector (e.g., [C, M, Y, K, W, T]=[50%, 0%, 50%, 0%, 0%], opaque green). Embodiments of the invention may modify the first CMYKWT colorization vector to increase or enhance a clarity ratio while maintaining the color ratio, so as to produce a second CMYKWT colorization vector (e.g., [C, M, Y, K, W, T]=[40%, 0%, 40%, 0%, 20%], transparent green). It has been found that increased transparency substantially reduces or eliminates the appearance of color differences (e.g., on left and right sides of the printed object). As used herein, the terms "clearness enhancement", "enhancing clearness" and "enhancing clarity" are used interchangeably and refer to a method consisting of introducing clear modeling material droplets at the surface regions of the printed object to attenuate or eliminate apparent color irregularities between different surfaces of said object.

In another example, embodiments of the invention may modify a color ratio, so as to produce a compensated color ratio, to overcome an apparent effect of color offset at a specific region of the printed 3D object and enhance a perceived color consistency at that region. This modification or compensation may be referred to herein as a "color compensation" solution. For example, embodiments of the invention may receive a 3D model data structure, that may include a first shell and a second shell, having a common interface or border (e.g., two components that are meant to be attached or juxtaposed). Each of the shells may include a plurality of SPs, associated with a first colorization vector representing a nominal (e.g., required) opaque green color ([C, M, Y, K, W, T]=[50%, 0%, 50%, 0%, 0%]). As explained herein, a colorization offset between the cyan and yellow print heads may cause a color discrepancy along the common interface, in relation to the nominal green value, depending on the positioning of the 3D printed object in the 3D printing machine (e.g., a slightly more yellow hue on the first shell and a slightly more cyan hue on the second shell). Embodiments of the invention may calculate the colorization offset, and may produce one or more colorization vectors, manifesting a modified or compensated color ratio, that may compensate for the calculated color offset. For example, embodiments of the invention may produce first colorization vector ([C, M, Y, K, W, T]=[55%, 0%, 45%, 0%, 0%]) for the first shell and a second colorization vector ([C, M, Y, K, W, T]=[45%, 0%, 55%, 0%, 0%]) for the second shell.

In yet another example, experimental results show that color consistency of a 3D printed object may be enhanced by adding a transparent envelope region at a surface of the object. This modification may be referred to herein as a "transparent envelope" solution. Embodiments of the invention may thus modify a 3D model used for printing a 3D printed object to include a transparent envelope region at an external surface of the 3D printed object to mitigate color discrepancy at that region.

Embodiments of the invention may apply a combination of one or more solutions (e.g., a clarity enhancement solution, a color compensation solution and a transparent envelope solution) within one or more regions of the 3D printed model, to enhance color uniformity within the respective regions. For example, a single region of the 3D printed object may be enveloped in a layer of transparent modeling material, may have a modified or compensated color ratio and a modified or enhanced clarity ratio, all intended to enhance color uniformity of that region.

As known in the art, colorization of 3D models may be presented on transmissive displays by a plurality of first colorization vectors, such as probabilistic RGB vectors. For example, light emitting diode (LED) display screens may emit light in red, green and blue colors and may be perceived by a viewer as a mixture of the emitted colors. The plurality of first colorization vectors (e.g., the probabilistic RGB vectors) may herein be referred to as source colorization vectors.

In contrast to colorization of transmissive displays, in order to perceive the same colors from a reflective object (e.g., from light reflected from a 3D printed object), a transformation from the plurality of source colorization vectors (e.g., the probabilistic RGB vectors) to a respective plurality of second colorization vectors (e.g., probabilistic CMYK vectors) must be performed. The plurality of second colorization vectors (e.g., the probabilistic CMYK vectors) may herein be referred to as target colorization vectors.

Embodiments of the present invention may include a slicer module (e.g., element 50 of FIG. 2), adapted to produce a plurality of slice elements, corresponding to respective planar slices of the 3D geometric shape represented by the shell. On or more (e.g., each) planar slice of the 3D geometric shape may be represented by a data structure that may include data pertaining to a plurality of printing points (PPs) aligned in a printing grid of the 3D printing machine.

According to some embodiments, for one or more (e.g., each) PP of one or more (e.g., each) slice, slicer module 50 may calculate values of components of target colorization vectors (e.g., CMYKW vectors, CMYKWT vectors) based on at least one source colorization vector (e.g., a source RGB vector pertaining to the closest SP to the respective PP), as elaborated herein. For example, slicer module 50 may convert source RGB vectors to target CMYKW vectors, as known in the art.

Slice data elements (e.g., elements 50A of Fig B) may be or may include a table, that may associate each printing point within the slice with one or more data elements such as: coordinates of the printing point (PP) within the printing grid a target colorization vector; and an identification of the shell point (SP) that is closest to the printing point. An example for a data structure of a slice data elements is provided in the following Table 2:

TABLE 2

| Printing point | PP Coordinates within slice | PP Target CMYKW vector | Closest SP | Closest SP Source RGB vector |
|---|---|---|---|---|
| PP1 | (X1, Y1) | [$C_1$, $Y_1$, $M_1$, $K_1$, $W_1$] | SP1 | [$R_1$, $G_1$, $B_1$] |
| PP2 | (X2, Y2) | [$C_2$, $Y_2$, $M_2$, $K_2$, $W_2$] | SP2 | [$R_2$, $G_2$, $B_2$] |

For example, as shown in the example of table 2, a first printing point (e.g., PP1) may be located in coordinates (X1, Y1) within the slice. This location may have a closest SP point that is SP1. The term 'closest' may refer in this context to a minimal physical distance to a shell point, according to any appropriate metric (e.g., a Euclidean distance). SP1 may be associated with a color that may be represented by a source colorization vector, such as a probabilistic RGB vector having component values of $R_1$, $G_1$ and $B_1$ respectively. Embodiments of the invention may calculate a first target colorization vector, such as e.g., a CMYKW colorization vector having component values of $C_1$, $Y_1$, $M_1$, $K_1$ and $W_1$ respectively. The target colorization vector (e.g., CMYKW) may be calculated as a function of a source colorization vector (e.g., RGB) of one or more SPs. For example, embodiments of the invention may convert an RGB source colorization vector (e.g., [$R_1$, $G_1$, $B_1$]) of the closest SP (e.g., SP1) to a first target colorization vector (e.g., [$C_1$, $Y_1$, $M_1$, $K_1$, $W_1$]) as known in the art, and associate the first target colorization vector with the respective printing point (e.g., PP1) as depicted in table 2.

Embodiments of the invention may apply one or more solutions for mitigating color discrepancy as elaborated above, in one or more levels (e.g., at a shell level and/or at a slice level) or stages (e.g., before slicing the model and/or after slicing the model) in the formation of PP target colorization vectors, as elaborated herein.

For example, embodiments of the invention may apply a color compensation solution on a first source colorization vector (e.g., [$R_1$, $G_1$, $B_1$]) of one or more SPs (e.g., SP1) by changing one or more component values of the first source colorization vector so as to produce a second, modified source colorization vector (e.g., [$R_{1'}$, $G_{1'}$, $B_{1'}$]). For example, embodiments of the invention may be configured to receive a color texture map that may be or may include 2-dimensional (2D) image data (e.g., in JPEG, BMP or PNG format). Embodiments of the invention may associate the color texture map with a shell data object by a process that is commonly referred to in the art as UV mapping. The UV mapping process may include associating a source colorization vector (e.g., a probabilistic RGB vector) to one or more (e.g., each) SP of the shell. Embodiments of the invention may modify the one or more source colorization vectors to attenuate color irregularities of edges of the printed 3D object.

Additionally, or alternatively, embodiments of the invention may apply a color compensation solution on a first target colorization vector (e.g., [$C_1$, $Y_1$, $M_1$, $K_1$, $W_1$]) of one or more PPs (e.g., PP1) by changing one or more component values of the first target colorization vector so as to produce a second, modified target colorization vector (e.g., [$C_{1'}$, $Y_{1'}$, $M_{1'}$, $K_{1'}$, $W_{1'}$]).

Additionally, or alternatively, embodiments of the invention may apply a clarity enhancement solution on a first source colorization vector (e.g., [$R_1$, $G_1$, $B_1$]) of one or more SPs (e.g., SP1) by, for example, introducing a transparency coefficient (commonly referred to in the art as an 'alpha' ($\alpha$) coefficient) to the first source colorization vector, so as to produce a second, modified source colorization vector (e.g., [$R_1$, $G_1$, $B_1$, $\alpha$]).

Additionally, or alternatively, embodiments of the invention may apply a clarity enhancement solution on a first target colorization vector (e.g., [$C_1$, $Y_1$, $M_1$, $K_1$, $W_1$]) of one or more PPs (e.g., PP1) by adding a transparency coefficient to the first target colorization vector (and normalizing the coefficients to sum up to 100%), so as to produce a second, modified target colorization vector (e.g., [$C_{1'}$, $Y_{1'}$, $M_{1'}$, $K_{1'}$, $W_{1'}$, $T_{1'}$]).

Disclosed embodiments are likewise applicable to objects composed of multiple parts that are 3D printed, in which case disclosed embodiments may be employed to coordinate the color, i.e. enhance uniformity, of adjacent surfaces in the assembled, compound object, e.g., preventing any color irregularities in the final object. The degree of clearness enhancement and/or compensatory colored modeling material component adjustments, the extent of the regions to which they are applied and their depths into the 3D objects, as well as their vectoral spatial adjustments may be determined and adjusted according to parameters and characteristics of the 3D objects and of the printing system, and according to the distribution of colors in the objects.

Figure 2:
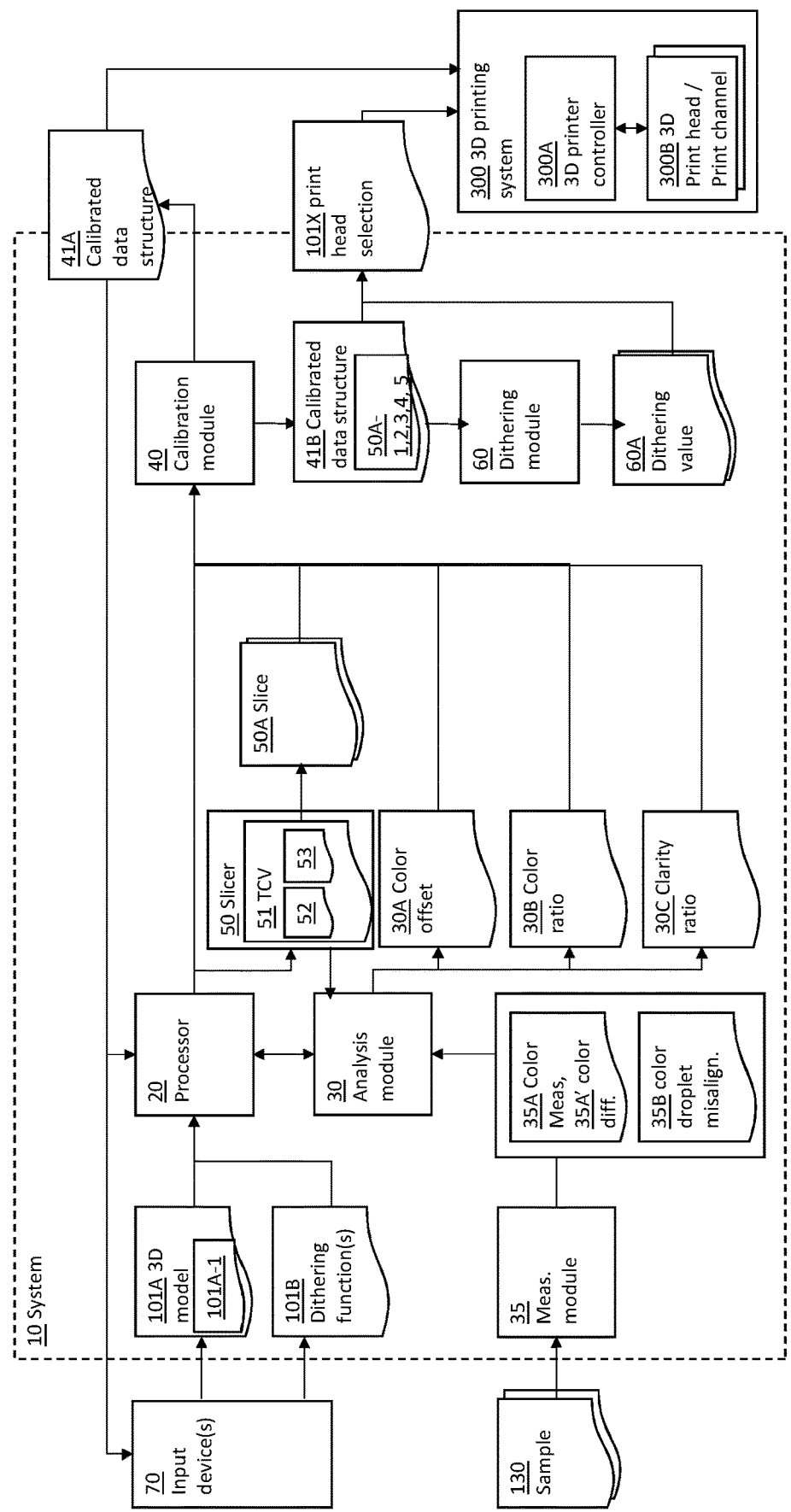
FIG. 2 is a block diagram depicting a system 10 for mitigating color offset discrepancies in 3D printing systems, according to some embodiments.

Reference is now made to FIG. 2, which is a block diagram depicting a system 10 for mitigating color offset discrepancies in 3D printing systems, according to some embodiments. System 10 may be implemented by one or more computing elements or devices (e.g., such as element 1 of FIG. 1) and may have one or more processors 20 (e.g., such as element 2 of FIG. 1). The one or more processors 20 may be adapted to control and/or execute one or more hardware and/or software modules, to apply or perform one or more methods for mitigating color offset discrepancies in 3D printing system 300, as elaborated herein.

As shown in FIG. 2, embodiments of the invention may include printing, by 3D printing system 300 one or more samples 130 of printed 3D printing material, according to one or more sample parameters, as elaborated herein. For example, the one or more samples 130 may be or may include a 3D printed sample (e.g., a cube) comprising one or more surfaces, as elaborated herein. Additionally, or alternatively, the one or more samples 130 may be or may include a pattern of one or more droplets of printing material.

the one or more sample parameters may include, for example:
- a type of a sample 130 (e.g., a 3D printed sample, a pattern of one or more droplets of printing material)
- a shape of a sample 130 (e.g., a cube, a prism, a hemisphere, a pyramid and the like);
- an orientation of a sample 130 (e.g., in relation to axes of a printing grid of 3D printing system 300);
- a pattern of a sample 130 (e.g., location of one or more droplets of printing material);
- a type of a 3D printing material (e.g., a rigid material such as Vero™, a flexible material such as Agilus™, an opaque material such as Vero™, a transparent material such as VeroVivid™, a material having one chemical phase, such as Vero™, a material that may be doped with additives such as e.g. silica and the like);
- a color of one or more 3D printing materials (e.g., components of a target colorization vector) in a sample 130;
- a color ratio (e.g., a ratio of colors among two or more printing materials) of at least one region of a sample 130;
- a clarity ratio (e.g., a ratio between clear printing material and one or more opaque color printing materials) of at least one region of a sample 130; and
- a finishing process (e.g., glossy, matt) of a sample 130.

According to some embodiments and as shown in FIG. 2, system 10 may include a measurement module 35, adapted to measure one or more parameters of the one or more samples 130, as elaborated herein. For example, measurement module 35 may be or may include a camera, a colorimeter, a spectrometer and the like, in accordance with the one or more measured parameters. Additionally, or alternatively, system 10 may be configured to receive the one or more measured parameters from an external source such as input device 70 of FIG. 2 and/or input device 7 of FIG. 1.

According to some embodiments, the or more samples 130 may be measured by measurement module 35, to obtain one or more parameters of the one or more samples.

For example, in an embodiment where a sample 130 is a 3D printed sample such as a cube, measurement module 35 may be a colorimeter, adapted to produce measured parameters such as: a measured representation of color 35A (e.g., as a LAB colorization vector) from one or more faces or surfaces of the 3D printed sample and/or a color difference 35A' between measured surfaces (e.g., in dE units).

It may be appreciated by a person skilled in the art that each printed sample 130 may include a combination of one or more of sample parameters. The resulting color may be measured and compared to a color measurement of a reference sample. For example, a reference sample may be a 3D printed surface that may be printed on a horizontal surface (e.g., parallel to a printing tray of Printing machine 300) with a white background and having a glossy finish. Color difference (e.g., in dE units) between the measured color of the 3D printed sample and the reference sample may include information pertaining to the specific printing conditions (e.g., the specific sample parameters). This information may be used for appropriate color correction.

In another example, in an embodiment where a sample 130 is a printed pattern of one or more droplets of 3D printing material, the measurement module 35 may be or may include a camera and may be adapted to identify a location pertaining to one or more droplets of 3D printing material (e.g., a location of a center point of the one or more droplets) and/or a misalignment 35B of one or more droplets. The term misalignment may be used herein to refer to a discrepancy or a difference of a location of a droplet in relation to a nominal or required location.

For example, a sample parameter may include a required or nominal location of a droplet or a printing tray of 3D printing system 300, whereas a measured droplet misalignment 35B may be a vectoral value, including a distance and a direction of the measured droplet location in relation to the nominal or required droplet location. In another example, a measured droplet misalignment 35B may be a vectoral value including a distance and a direction between a first measured droplet location (e.g., of a first printing material, printed by a first printing head 300B) and a second measured droplet location (e.g., of a second printing material, printed by a second printing head 300B).

According to some embodiments, system 10 may include an analysis module 30 adapted to analyze output of measurement module 35 (e.g., one or more of color measurement 35A, color difference 35A' and droplet misalignment 35B) to obtain from the one or more samples a color offset vector 30A. As elaborated herein, color offset vector 30A may be a vectoral value including a direction and/or an extent or distance of misalignment between different print heads (e.g., print heads of different color) of 3D printing system 300.

Figure 3A:
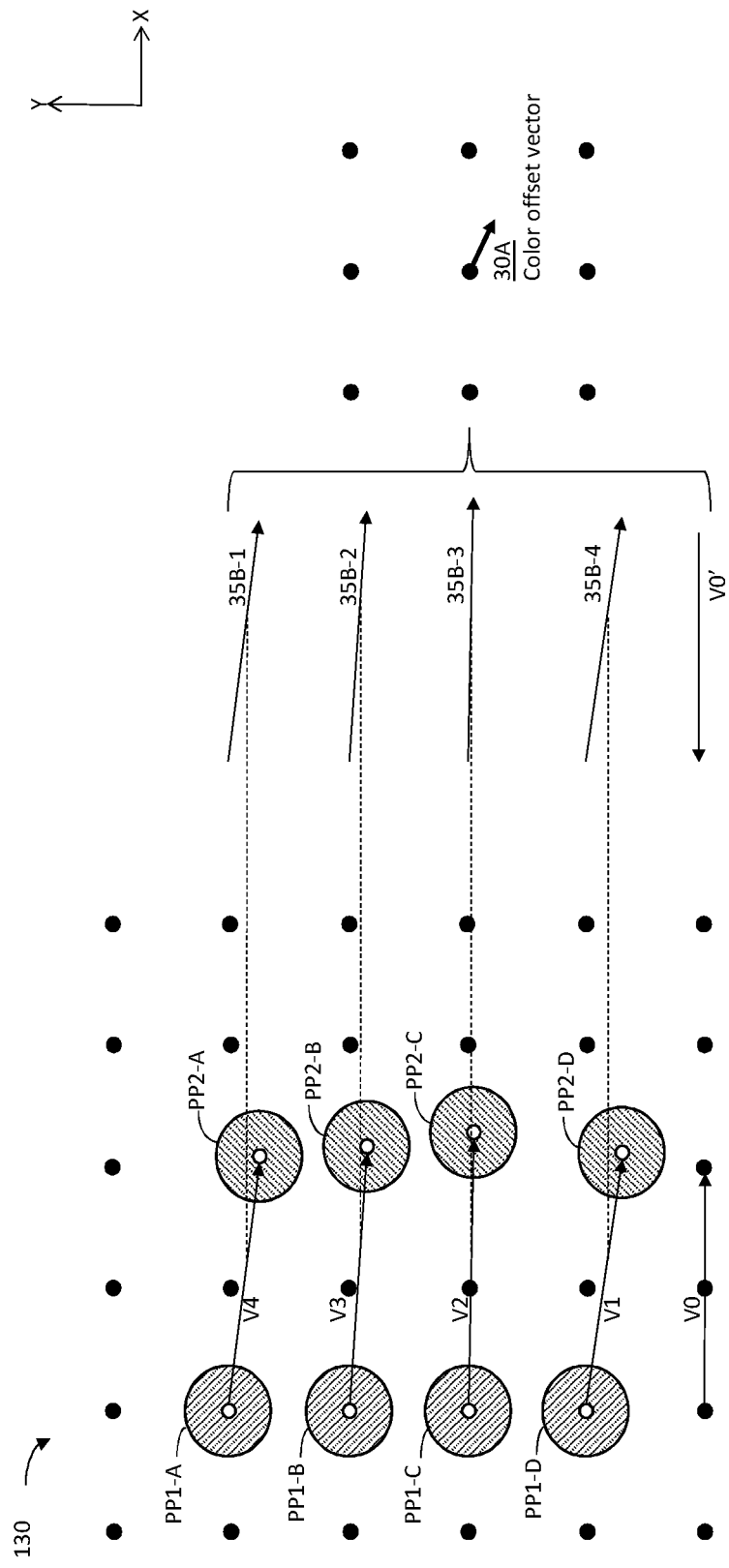
FIG. 3A, is a schematic diagram depicting a method of obtaining a color offset vector according to some embodiments of the invention.

Reference is now made to FIG. 3A, which is a schematic diagram depicting a method of obtaining a color offset vector 30A, according to some embodiments of the invention.

As shown in FIG. 3A, sample 130 may include one or more patterns of one or more printed droplets of colored modeling material. Measurement module 35 may measure a location of one or more droplets of the pattern of droplets and Analysis module 30 may calculate a color droplet misalignment according to the measured locations, to derive the color offset vector 30A from the calculated droplet misalignment.

For example, as depicted in FIG. 3A, sample 130 may include one or more droplets of a first printing material (e.g., a first color) PP1 (e.g., PP1-A through PP1-D) at a first set of predefined locations on a 3D printing grid (e.g., marked as black points), and one or more droplets of a second printing material (e.g., a second color) PP2 (e.g., PP2-A through PP2-D) at a second set of predefined locations on the 3D printing grid.

Figure 14C:
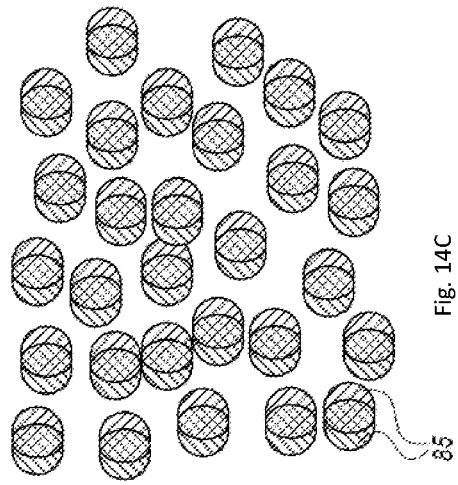
FIG. 14A through FIG. 14C are high level schematic illustrations of multiple approaches to modeling material droplet distributions and corresponding correction of color irregularities, according to some embodiments of the invention.
Figure 14B:
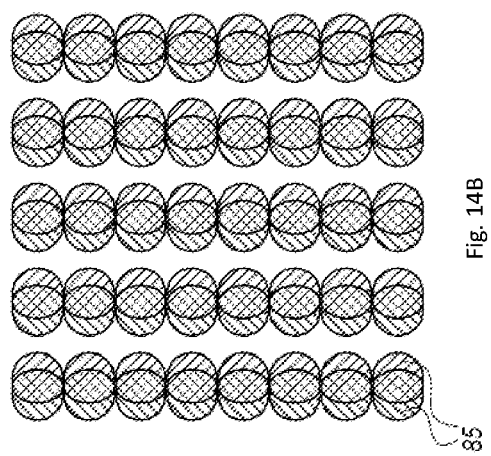
Figure 14A:
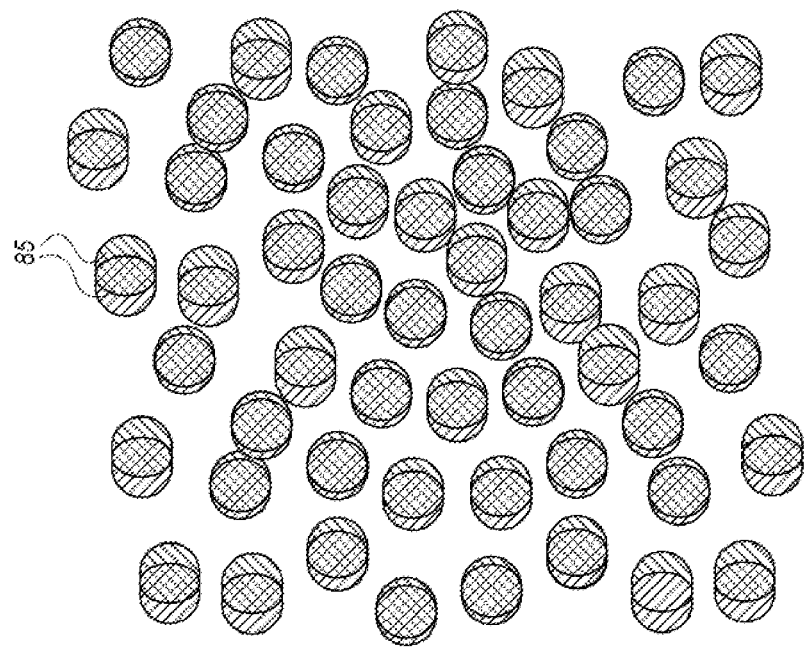

Measurement module 35 may provide one or more (e.g., a plurality) of droplet misalignment measurement values 35B as demonstrated herein (e.g., in relation to FIG. 14A, between a cyan color print head 300B and a magenta color print head 300B). For example, as depicted in FIG. 3A, the plurality of droplet misalignment measurement values 35B (e.g., 35B-1 through 35B-4) may be vectors of misalignment V (e.g., V1 through V4) between centers (e.g., marked as white points) of PPs of the first printing material (e.g., PP1s) and respective centers of PPs of the first printing material (e.g., PP2s).

Analysis module 30 may analyze the plurality of droplet misalignment measurements 35B to obtain a calculated color offset vector 30A (e.g., as a mean vectoral value of the plurality of droplet misalignment measurement values 35B). It may be appreciated that droplet pattern sample 130 as depicted in FIG. 3A may include an offset (e.g., V0) between droplets of the first printing material (e.g., PP1s) and droplets of the second printing material (e.g., PP2s), which may be taken into consideration (e.g., V0') by analysis module 30 in the calculated of color offset vector 30A.

Figure 3C:
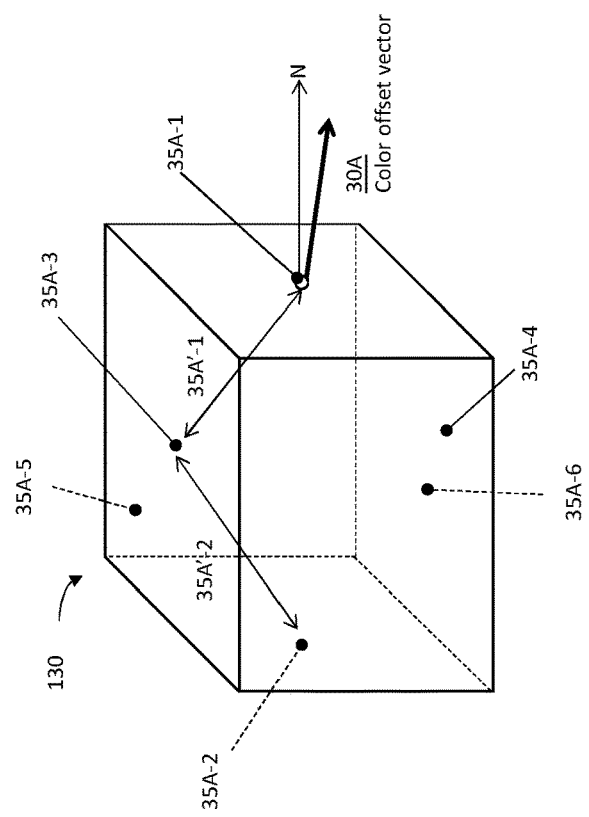
FIG. 3C, is a schematic diagram depicting yet another method of obtaining a color offset vector according to some embodiments of the invention.
Figure 3B:
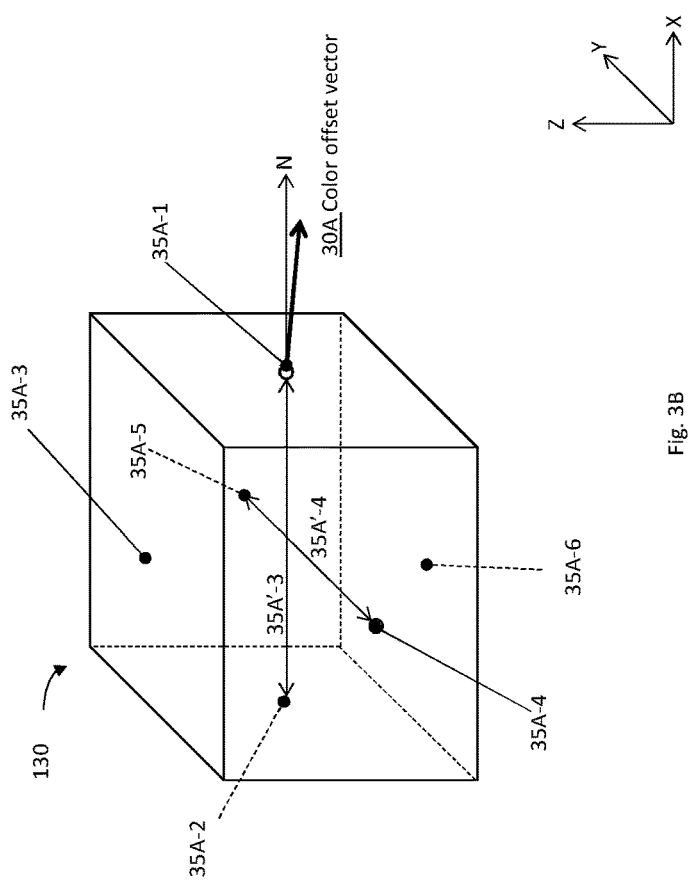
FIG. 3B, is a schematic diagram depicting another method of obtaining a color offset vector according to some embodiments of the invention.

Reference is now made to FIG. 3B and FIG. 3C, which are schematic diagrams depicting methods of obtaining a color offset vector 30A, according to some embodiments of the invention.

Figure 6:
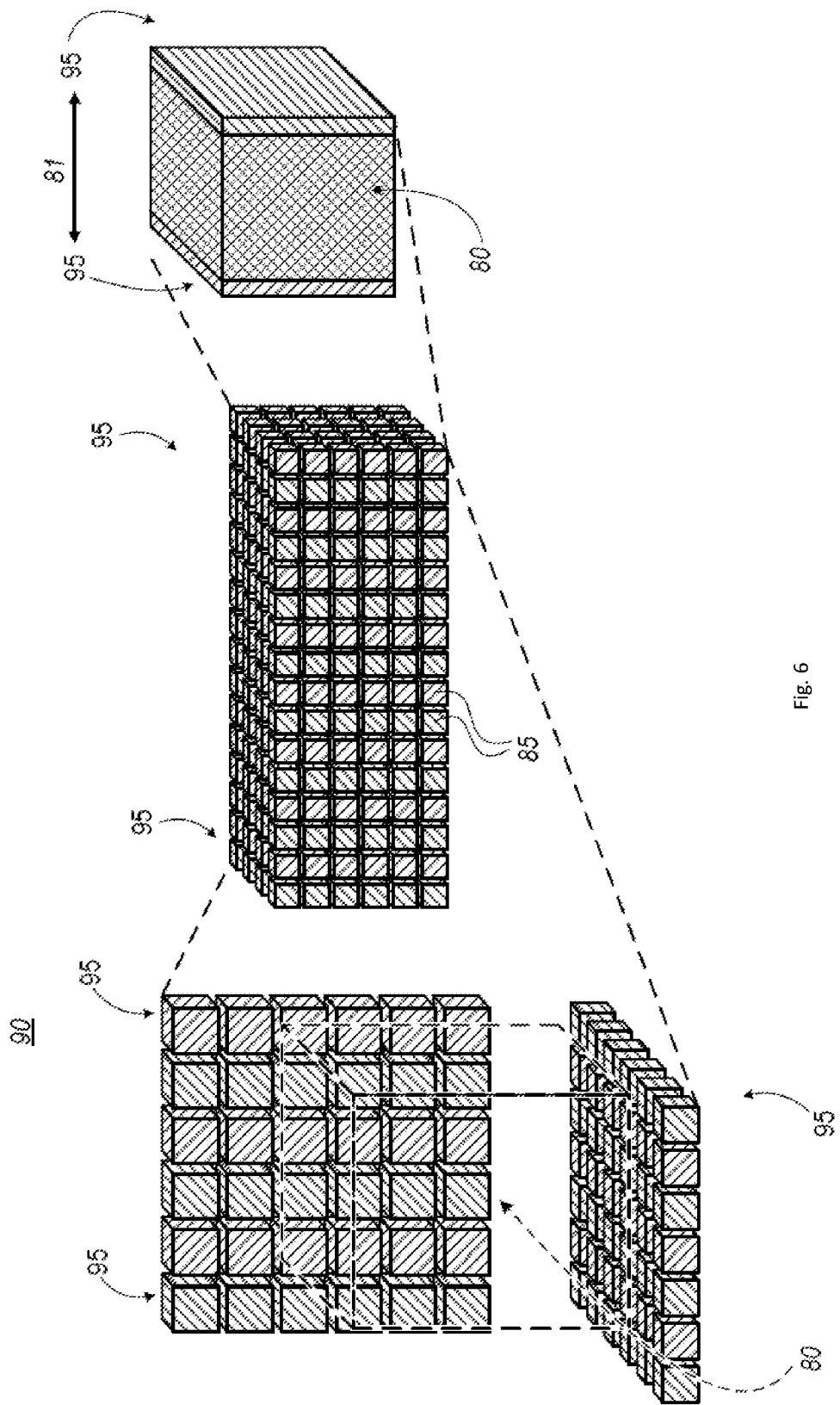
FIG. 6 is a high level schematic illustration of an inkjet-printed 3D object without enhanced color uniformity.

As depicted in FIG. 3B and FIG. 3C, sample 130 may be or may include a 3D shape (e.g., a cube) of uniform color that may include a plurality of flat surfaces at specified spatial orientations. Sample 130 may include a combination of two or more printing materials or colors (e.g., as depicted in FIG. 6) that may be deposited by respective two or more print heads 300B. Sample 130 may (e.g., as a simplified, non-limiting example) be aligned with a print may of 3D printing system 300, such that a first pair of surfaces may be each aligned in a plane that is parallel to an XZ plane of the printing array and a second pair of surfaces may be each aligned in a plane that is parallel to a YZ plane of the printing array.

As elaborated herein (e.g., in relation to FIG. 6) a bulk section of printed 3D sample 130 (e.g., parallel to the XY plane) may exhibit a color that may be substantially equivalent to the nominal or required color (e.g., a 'reference' color), whereas external faces, surfaces or edges of printed sample 130 that may be perpendicular to the printing tray (e.g., parallel to the XZ plane or parallel to the YZ plane) may exhibit color differences due, for example, to misalignment of print heads 300B.

Therefore, measurement module 35 may provide one or more color measurement values 35A corresponding to each surface of the printed object (e.g., 35A-1 (right surface), 35A-2 (left surface), 35A-3 (top surface), 35A-4 (front surface), 35A-5 (back surface) and 35A-6 (bottom surface)).

Additionally, or alternatively, measurement module 35 may provide one or more color difference values 35A' (e.g. 35A'-1 (color difference between right surface and top surface), 35A'-2 (color difference between left surface and top surface), 35A'-3 (color difference between right surface and left surface), 35A'-4 (color difference between front surface and back surface)) pertaining to surfaces of the printed 3D sample.

Analysis module 30 may subsequently analyze the one or measurements values (e.g., 35A) and/or one or more color difference values (e.g., 35A') of measurement module 35 to determine a color offset 30A' between a first print head (associated with a first 3D printing material or color) and one or more second print heads (associated with one or more second 3D printing materials or colors).

For example, as depicted in the example of FIG. 3C, measurement module 35 may relate to a first color measurements (e.g., 35A-3 of the top surface) as a reference, and may provide a first color difference value (e.g. 35A'-1, color difference between right surface and top surface) and a second value (e.g., 35A'-2, color difference between left surface and top surface). Analysis module 30 may analyze these values and may produce a color offset vector that is parallel to the XY plane.

Additionally, or alternatively, analysis module 30 may relate to the measurement of the top surface (e.g., 35A-3) as a reference color, and may subtract therefrom the measured color of the right surface (e.g., 35A-1) to obtain a color difference value 35A', pertaining to discrepancy of color on the right surface. Analysis module 30 may subsequently produce a modified CMYKW and/or CMYKWT colorization vector to enhance color uniformity of a surface of a 3D printed object, based on the calculated color difference, as elaborated herein (e.g., in relation to FIG. 17).

Additionally, or alternatively, as depicted in the example of FIG. 3B measurement module 35 may measure the color of two or more of the plurality of flat surfaces and may calculate one or more color differences 35A' (e.g., 35A'-3, color difference between right surface and left surface and 35A'-4, color difference between front surface and back surface). Analysis module 30 may derive color offset vector 30A from the calculated color differences. Analysis module 30 may subsequently produce a calibrated data structure 41B comprising one or more printing points having a modified colorization vector (e.g., CMYKW, CMYKWT) to enhance color uniformity of a surface of a 3D printed object, based on the calculated color difference, as elaborated herein (e.g., in relation to FIG. 17).

As elaborated herein (e.g., in relation to FIG. 17), one or more values of components of the modified colorization vector (e.g., CMYKW, CMYKWT) may be dependent upon a projection of a normal vector of a surface of the 3D model upon the color offset vector.

Additionally, or alternatively, measurement module 35 may provide a first color difference value 35A'-1 (e.g., in dE units) pertaining to a difference in color between the surfaces of the first pair (right/top) and a second color difference measurement value 35A'-2 pertaining to a difference in color between the surfaces of the second pair (left/top), 35A'-1 and 35A'-2 being characteristic of an X offset of at least two printheads. Similarly, measurement module 35 may provide a third color difference value 35A'-5 pertaining to a difference in color between the surfaces of a third pair (front/top) and a fourth color difference measurement value 35A'-6 pertaining to a difference in color between the surfaces of the fourth pair (back/top), 35A'-4 and 35A'-5 being characteristic of a Y offset of at least two printheads.

Analysis module 30 may analyze the color difference values provided by measurement module 35, to derive color offset vectors 30A (e.g., 30A-1 parallel to the XY plane).

According to some embodiments of the invention, system 10 may receive one or more input data elements 101 (e.g., 101A, 101B) from one or more input devices 70 (e.g., such as computing device 1 of FIG. 1). Alternatively, or additionally, system 10 may receive the one or more input data elements 101 via an input device such as element 7 of FIG. 1 (e.g., from a user).

The one or more input data elements 101 may include a 3D model data element 101A that may represent a 3D object for printing. 3D model 101A may include a plurality of model printing points, where at least one (e.g., all) printing point may be associated with a respective color.

For example, 3D model data element 101A may be or may include one or more shell data elements 101A-1. The one or more shell data elements 101A-1 may correspond to a 3D geometric shape of an object. Additionally, or alternatively, the one or more shell data elements 101A-1 may define an edge or border of a 3D object to be printed. As elaborated herein, shell 101A-1 may include a plurality of shell points. One or more (e.g., all) of the plurality of shell points may be associated with respective source colorization vectors (e.g., RGB colorization vectors).

For example, a received shell data element 101A-1 may be or may include a data structure (e.g., a table) wherein a plurality of shell points are defined according to their geometric locations (e.g., on X, Y, and Z axes) and associated with a source colorization vector (e.g., a probabilistic RGB colorization vector) as in the following example of table 3:

TABLE 3

| Shell point | SP Coordinates | SP Source RGB vector |
|---|---|---|
| SP1 | (X1, Y1, Z1) | [$R_1$, $G_1$, $B_1$] |
| SP2 | (X2, Y2, Z2) | [$R_2$, $G_2$, $B_2$] |

According to some embodiments of the invention, system 10 may include a calibration module 40, configured to analyze 3D model 101A in view of an obtained or calculated color offset vector 30A, to produce a calibrated data structure 41 (e.g., 41A, 41B).

Calibrated data structure 41 may be or may include any type of appropriate data structure (e.g., a table) that may represent at least one modified portion of 3D model 101A, so as to mitigate color discrepancies.

As elaborated herein, calibration module 40 may analyze received shell 101A-1 of 3D model 101-A in view of color offset vector 30A. and may subsequently produce a calibrated data structure 41 (e.g., 41A, 41B). Embodiments of the invention may propagate or send the calibrated data structure (or a derivative thereof) to 3D printing system 300, which may in turn print a 3D object according to the calibrated data structure.

For example, as elaborated herein, embodiments of the invention may produce from the calibrated data structure (e.g., 41B) a print head selection 101X. Print head selection 101X may include an association of at least one printing point of a printing grid of 3D printing system 300 with a specific print head 300B (and a respective color component). Printing system 300 may in turn print a 3D object according to the print head selection 101X derived from calibrated data structure 41B.

According to some embodiments of the invention, and as depicted in the example of FIG. 2, calibrated data structure 41A may include a modified shell data structure (e.g., as in the example of table 3) that may be modified in relation to the received shell data element 101A-1 (e.g., having modified source colorization RGB and/or alpha transparency values), so as to mitigate color discrepancy that may occur upon printing the 3D object by 3D printing system 300. Processor 20 may propagate or send the calibrated data structure 41A (e.g., the modified 3D model) to 3D printing system 300, which may in turn print a 3D object according to the calibrated data structure (e.g., according to the modified shell data structure). Additionally, or alternatively processor 20 may propagate of send calibrated data structure 41A to the originator of 3D model 101A (e.g., to input element 7 of FIG. 1 and/or to input device 70) as feedback.

In another example, calibrated data structure 41A may include a modified 3D model data element, having one or more (e.g., a plurality) of model printing points. The one or more model printing points may be modified in relation to respective model printing points of the received 3D model data element 101A. For example, calibrated data structure 41A may include a modified 3D model data element that may include one or more shell data elements that may respectively define one or more of: a transparent envelope region, a clarity enhancement region, a color compensation region and a white region, as elaborated herein. Processor 20 may propagate or send the calibrated data structure 41A (e.g., the modified 3D model) to 3D printing system 300, which may in turn print a 3D object according to the calibrated data structure (e.g., according to the modified 3D model). Additionally, or alternatively processor 20 may propagate of send calibrated data structure 41A to the originator of 3D model 101A (e.g., to input element 7 of FIG. 1 and/or to input device 70) as feedback.

As shown in FIG. 2, calibrated data structure 41A may be returned (e.g., as feedback data) to an originator of the 3D model 101A (e.g., to input device 70). Additionally, or alternatively, calibrated data structure 41A may be returned to processor 20, that may present the applied modification (e.g., modification in shell data structure) e.g., via output device 8 of FIG. 1. Additionally, or alternatively, system 10 may forward calibrated data structure 41A to 3D printing system 300, which may in turn print the 3D object according to the calibrated data structure.

Additionally, or alternatively, calibrated data structure 41B may include one or more slice data structures (e.g., as in the example of table 2) that may be adapted, as elaborated herein, to mitigate color discrepancy that may occur upon printing the 3D object by 3D printing system 300, as elaborated herein.

Reference is now made to FIG. 4A, which is a schematic diagram demonstrating process of slicing a shell (e.g., element 101A-1 of FIG. 2) of a 3D object (e.g., depicted as a globe) by a system 10 for mitigating color offset discrepancies in 3D printing systems, according to some embodiments. As shown in FIG. 4A, system 10 may produce a plurality of slice elements 50A, corresponding to respective planar slices of the 3D geometric shape (e.g., the globe) represented by shell 101A-1.

As shown in FIG. 2, according to some embodiments of the invention, system 10 may include a slicer module 50, configured to produce a plurality of slice elements 50A, corresponding to respective planar slices of the 3D geometric shape represented by the shell.

One or more (e.g., each) slice element 50A may be or may include a data structure that may include data pertaining to a plurality of printing points (PPs) aligned in a printing grid of the 3D printing machine, as shown in the example of table 4, below:

TABLE 4

| Slice | Print point | PP Coordinates | colorization vector |
|---|---|---|---|
| S1 | PP1 | (X1, Y1) | [$C_1$, $Y_1$, $M_1$, $K_1$, $W_1$, $T_1$] |
| S1 | PP2 | (X2, Y2) | [$C_2$, $Y_2$, $M_2$, $K_2$, $W_2$, $T_2$] |
| S1 | PP3 | (X3, Y3) | [$C_3$, $Y_3$, $M_3$, $K_3$, $W_3$, $T_3$] |

According to some embodiments of the invention, calibration module 40 may receive at least one slice data element and modify the value of at least one colorization vector component, to produce a calibrated data structure 41B that may be adapted to mitigate color discrepancies, as elaborated herein.

For example, calibrated data structure 41B may be or may include a data structure that may associate one or more (e.g., each) PP of one or more slices with a respective set of coordinates and with respective target colorization vector, as shown in the example of table 5, below:

TABLE 5

| Slice | Print point | PP Coordinates | colorization vector |
|---|---|---|---|
| S1 | PP1 | (X1, Y1) | $[C'_1, Y_1, M'_1, K_1, W_1, T_1]$ |
| S1 | PP2 | (X2, Y2) | $[C_2, Y'_2, M_2, K_2, W_2, T_2]$ |
| S1 | PP3 | (X3, Y3) | $[C_3, Y_3, M_3, K_3, W_3, T_3]$ |
| S2 | PP4 | (X4, Y4) | $[C'_4, Y'_4, M'_4, K_4, W_4, T_4]$ |
| S2 | PP5 | (X5, Y5) | $[C_5, Y_5, M_5, K_5, W_5, T'_5]$ |

As shown in the example of table 5, calibrated data structure 41B may include data pertaining to colorization vectors of one or more PPs of one or more respective slices. In the example of table 5, one or more colorization vector components (e.g., $C_1$, $M_1$, $Y_2$) may be modified in relation to the respective values in respective slice data elements 50A (e.g., in comparison with the example of table 4).

In other words, slicer module 50 may produce a plurality of slice elements 50A, corresponding to planar slices of the 3D object. Each slice including a plurality of slice PPs. One or more (e.g., each) slice PP may be associated with a color (e.g., represented by a colorization vector) of the calibrated data structure.

Embodiments of the present invention may apply, for one or more slice PPs, a dithering algorithm on the calibrated data structure, as elaborated herein, to obtain a dithering value 60A. Dithering value 60A may be or may include for example an identification of a color or component in a colorization vector. For example, in an embodiment where the colorization vector is a CMYKWT vector, dithering value 60A may be a component of that vector (e.g., C (Cyan), M (Magenta), etc.).

Embodiments of the present invention may produce a print head selection 101X for one or more slice printing points according to the dithering value 60A as elaborated herein and may propagate print head selection 101X to 3D printing system 300, which may in turn produce a 3D printed object according to the print head selection.

According to some embodiments system 10 may include a dithering module 60, configured to receive at least one configuration of a dithering function 101B, analyze content of a calibrated data structure in view of the dithering function 101B, and produce a selection 101X of a print head 300B of 3D printing system or machine 300 according to calibrated data structure 41B for one or more (e.g., each) PP.

Dithering function 101B may be, for example, maximum function, a thresholding dithering function, a random dithering function, a patterning dithering function, an ordered dithering function, an error diffusion dithering function and any combination thereof, as known in the art.

For example, dithering function 101B may be a maximum function. Accordingly, dithering module 60 may produce a selection 101X of a print head 300B for one or more specific PPs (e.g., PP1), where print head 300B corresponds to a maximal component of the corresponding colorization vector (e.g., a maximal value among the $C_1$, $Y_1$, $M_1$, $K_1$, $W_1$ and $T_1$ values).

In another example, dithering function 101B may be an error diffusion dithering function.

Accordingly, dithering module 60 may alter a value of at least one component of a colorization vector of one or more (e.g., each) PP by adding a random noise value (e.g., a "blue" noise, as commonly referred to in the art) to the at least one component. Dithering module 60 may subsequently produce a selection 101X of a print head 300B for one or more specific PPs (e.g., PP1), where print head 300B corresponds to a maximal component of the corresponding modified colorization vector (e.g., a maximal value among the modified $C_1$, $Y_1$, $M_1$, $K_1$, $W_1$ and $T_1$ values).

System 10 may communicate or send the print head selection 101X to 3D printing system 300, which may, in turn, print the 3D object according to the dithered value 60A of calibrated data structure 41B. Thus, system 10 may mitigate color offset discrepancies in 3D printed objects that may be produced by 3D printing system or machine 300.

As known in the art, print head 300B may be or may include a hardware component that may be adapted to dispense a specific 3D printing material (e.g., 3D printing ink) at a determined quantity and location of a printing grid of 3D printing machine 300. For example, print head 300B may include a dispenser of a printing material of specific color (e.g., cyan), and may be controlled, for example, by a driver or controller 300A of 3D printer 300 to dispense the printing material in a specific location in the printing grid.

Selection 101X may be or may include a data element or structure that may associate at least one point in the 3D printer's grid with a selection of a specific print head 300B. For example, selection 101X may be or may include one or more entries in a table, that may associate geometric indices, such as X and Y coordinates of a printing grid and a Z coordinate (e.g., which may normally translate to an index of a slice of a 3D printed model), with a selection of a printing head. An example for such a table is brought herein in table 6:

TABLE 6

| Printing Point | X | Y | Z | C | M | Y | K | W | T |
|---|---|---|---|---|---|---|---|---|---|
| PP1 | X1 | Y1 | Slice 1 | 1 | 0 | 0 | 0 | 0 | 0 |
| PP2 | X2 | Y2 | Slice 2 | 0 | 1 | 0 | 0 | 0 | 0 |
| PP3 | X3 | Y3 | Slice 3 | 0 | 0 | 0 | 1 | 0 | 0 |

In the example of Table 6:

Each entry relates to a specific printing point (e.g., PP1, PP2, PP3);

X represents the X coordinates on the printing grid of 3D printer 40 (e.g., X1, X2, X3);

Y represents the Y coordinates on the printing grid of 3D printer 40 (e.g., Y1, Y2, Y3);

Z represents the slice index (e.g., slice 1, slice 2, slice 3);

C, M, Y, K, W and T respectively represent printing heads that dispense Cyan, Magenta, Yellow, Black, White and Transparent printing material.

In this example:

a cyan point may be dispensed at coordinates (X1, Y1) of slice 1;

a magenta point may be dispensed at coordinates (X2, Y2) of slice 2; and a black point may be dispensed at coordinates (X3, Y3) of slice 3.

As known in the art, the term 3D printing head may refer to a hardware component that may dispense 3D printing material at a predefined position Implementations of commercially available 3D printing heads may include a single channel (e.g., hold a single type or color of printing material) or a multiple channel (e.g., hold one or more types or colors of printing materials). For the purpose of clarity, in the context of this document, the term 3D printing head may refer to a single channel of a dispenser of a printing material or color. It may be appreciated by a person skilled in the art that adaptations may be made so as to relate to printing heads having multiple channels as well.

As shown in FIG. 2, system 10 may be communicatively connected (e.g., via a communication network such as the internet) with 3D printer 300. System 10 may produce a print head selection 101X and communicate selection 101X to 3D printer 300 via the communication network. 3D printer controller or driver 300A may control one or more hardware elements of 3D printer 300 such as the one or more print heads 300B so as to print a 3D object according to the data included in selection 101X.

Alternatively, system 10 may be included within 3D printer 300. For example, the one or more processors 20 of system 10 may be or may include the same entity as controller 300A and may communicate with hardware elements of 3D printer 300 such as print head 300B to produce a 3D printed object.

Reference is now made to FIG. 4B, which is a schematic diagram depicting a slice of a shell representing a 3D object that may have been modified by an embodiment of the system 10 for mitigating color offset discrepancies in 3D printing systems, according to some embodiments.

As explained herein (e.g., in relation to FIG. 13B) color difference discrepancies may be mitigated by applying a layer or envelope of clear 3D printing material on an external side or face of a printed 3D object. As explained herein (e.g., in relation to FIG. 4A), system 10 may produce a plurality of slice elements 50A, corresponding to respective planar slices of the 3D geometric shape (e.g., the globe) represented by shell 101A-1.

As explained herein (e.g., in relation to table 5), calibration module 40 may produce a calibrated data structure 41B that may include one or more data slice data elements that may be modified in relation to respective slice data elements (e.g., compare with element 50A of FIG. 4A).

In the example of FIG. 4B, calibration module 40 may define a transparent envelope region 50A-3 comprising a plurality of printing points that may be associated with a clear printing material, on an external surface of the model.

According to some embodiments of the invention, calibration module 40 may define a core region 50A-2 comprising a plurality of PPs in an internal region of the model. As the core region may not be visible to a viewer of the printed 3D object, PPs of core region may be associated with a printing material according to considerations other than the respective PPs color. For example, PPs of core region 50A-2 may be associated with a printing material that may be relatively inexpensive. In another example, PPs of core region 50A-2 may be associated with a printing material that may be seldom used, so as to avoid clogging of a respective print head nozzle.

As shown in FIG. 4B, calibrated data structure 41B that may include a colored region 50A-1, that may include a plurality of printing points that may be unchanged in relation to respective colored printing points 50A-1 of slice 50A.

For example, calibration module 40 may produce a calibrated data structure 41B that may correspond to regions 50A-1, 50A-2 and 50A-3 of FIG. 4B, similar to the example of table 7, below:

TABLE 7

| Slice | Print point | PP Coordinates | colorization vector (e.g., [C, M, Y, K, W, T]) |
|---|---|---|---|
| S1 | PP1 (e.g., in 50A-1) | (X1, Y1) | $[C_1, Y_1, M_1, K_1, W_1, T_1]$ |
| S1 | PP2 (e.g., in 50A-1) | (X2, Y2) | $[C_2, Y_2, M_2, K_2, W_2, T_2]$ |

TABLE 7-continued

| Slice | Print point | PP Coordinates | colorization vector (e.g., [C, M, Y, K, W, T]) |
|---|---|---|---|
| S1 | PP3 (e.g., in 50A-1) | (X3, Y3) | $[C_3, Y_3, M_3, K_3, W_3, T_3]$ |
| S1 | PP4 (e.g., in 50A-2) | (X4, Y4) | [0, 0, 0, 100%, 0, 0] |
| S1 | PP5 (e.g., in 50A-2) | (X5, Y5) | [0, 0, 0, 100%, 0, 0] |
| S1 | PP6 (e.g., in 50A-3) | (X6, Y6) | [0, 0, 0, 0, 0, 100%] |
| S1 | PP7 (e.g., in 50A-3) | (X7, Y7) | [0, 0, 0, 0, 0, 100%] |

In the example of table 7:

PP1, PP2 and PP3 may be included in a region (e.g., 50A-1) that may not be modified in relation to slice 50A;

PP4 and PP5 may be included in a core region (e.g., 50A-2), and may be assigned a core color (e.g., an inexpensive color, marked in table 7 as black); and PP6 and PP7 may be included in a transparent envelope region (e.g., 50A-3) that may be modified in relation to respective PPs of slice 50A (e.g., region 50A-1 of FIG. 4A) to include PPs associated with or having a clear color, on an external surface of the model.

Reference is now made to FIG. 4C, which is another schematic diagram depicting a slice of a shell representing a 3D object that may have been modified by an embodiment of the system 10, for mitigating color offset discrepancies in 3D printing systems, according to some embodiments.

As elaborated herein (e.g., in relation to FIG. 13E) color difference discrepancies may be mitigated by applying a "color compensation" solution, in which a color ratio (e.g., a ratio between two or more printing materials) may be modified at a specific region of the printed 3D object, and may thus enhance a perceived color consistency at that region.

As explained herein (e.g., in relation to FIG. 4A), system 10 may produce a plurality of slice elements 50A, corresponding to respective planar slices of the 3D geometric shape (e.g., the globe) represented by shell 101A-1.

As elaborated herein (e.g., in relation to FIG. 2), analysis module 30 may calculate color offset 30A from at least one color measurement 35A and/or color difference measurement 35A' of a sample 130. Analysis module may calculate a compensated color ratio 30B between two or more colors based on calculated color offset vector 30A, as elaborated herein (e.g., in relation to FIG. 17).

As shown in the example of FIG. 4C, calibration module 40 may define a color compensation region 50A-4 that may include a plurality of printing points. Calibration module 40 may modify a colorization vector value of one or more (e.g., each) PP of color compensation region 50A-4 in relation to respective PPs of slice data element 50A.

For example, calibration module 40 may modify colorization vector component values of PPs in color compensation region 50A-4 so as to apply compensation on color ratio 30B at that region. In other words, calibration module 40 may modify the colorization vector values of a plurality of printing points in color compensation region 50A-4 so as to associate the one or more (e.g., the plurality) of PPs with two or more colors at the compensated color ratio 30B.

For example, assuming a PP (e.g., PP1) of a slice data element 50A is assigned an initial colorization vector value (e.g., opaque green [C, M, Y, K, W, T]=[50%, 0%, 50%, 0%, 0%]) by slicer 50. Analysis module 30 may calculate a color offset 30A between two or more components of the colorization vector (e.g., between a cyan component and a yellow component). Analysis module 30 may determine that due to the calculated color offset 30A (e.g., between the cyan component and the yellow component) a specific region may appear more cyan than the required normal value. Analysis module 30 may thus determine a compensation of the color ratio 30B (e.g., a ratio of 45% to 55% between the cyan component and the yellow component instead of a 50%-55% ratio) that may be applied to the respective region, so as to mitigate color discrepancy (e.g., display the nominal, required color) in that region. Calibration module 40 may define a color compensation region 50A-4 that may include one or more PPs (e.g., including PP1), and may produce a calibrated data structure 41B. The calibrated data structure 41B may include one modified colorization vector values pertaining to one or more PPs of color compensation region 50A-4, having a colorization vector that may be modified according to the compensated color ratio (e.g., [C, M, Y, K, W, T]=[45%, 0%, 55%, 0%, 0%]).

Figure 4F:
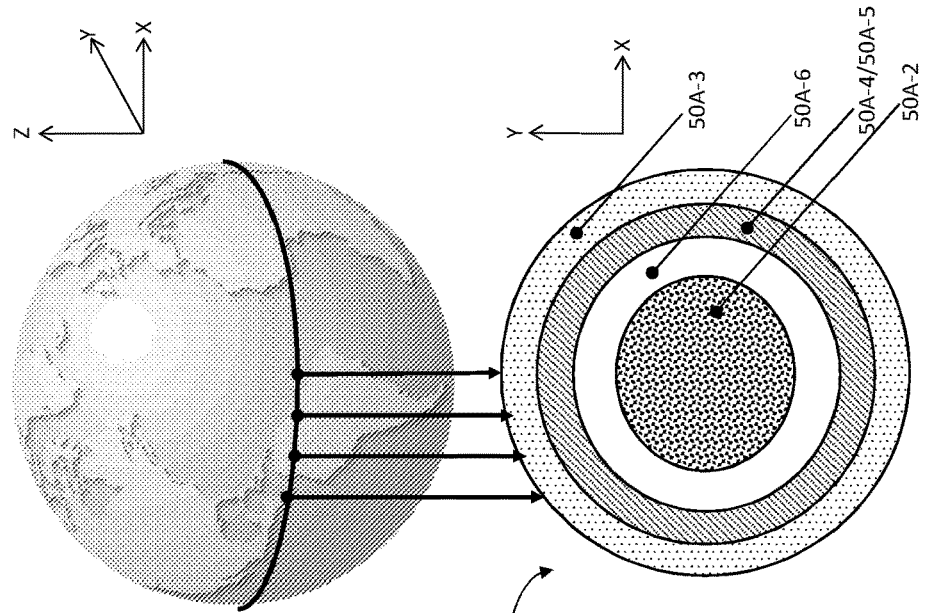
Figure 4E:
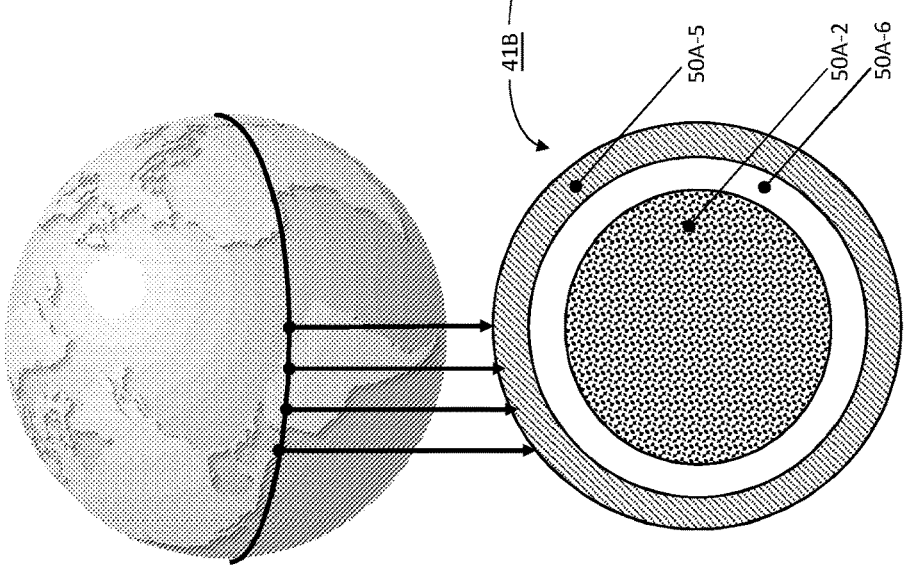
Figure 4D:
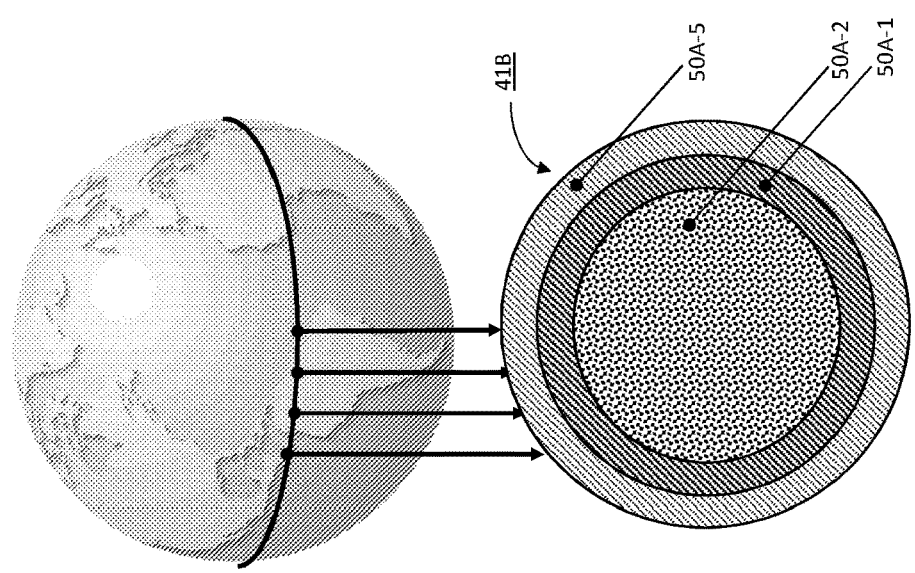

Reference is now made to FIG. 4D, which is another schematic diagram depicting a slice of a shell representing a 3D object that may have been modified by an embodiment of the system 10, for mitigating color offset discrepancies in 3D printing systems, according to some embodiments.

As elaborated herein (e.g., in relation to FIG. 13B) color difference discrepancies may be mitigated by applying a "clarity enhancement" solution, in which a clarity ratio (e.g., a ratio between two or more printing materials) may be modified at a specific region of the printed 3D object and thus enhance a perceived color consistency at that region.

As explained herein (e.g., in relation to FIG. 4A), system 10 may produce a plurality of slice elements 50A, corresponding to respective planar slices of the 3D geometric shape (e.g., the globe) represented by shell 101A-1.

As elaborated herein (e.g., in relation to FIG. 2), analysis module 30 may calculate color offset 30A from at least one color measurement 35A and/or color difference measurement 35A' of a sample 130. Analysis module may calculate an enhanced clarity ratio 30C between a clear 3D printing material and at least one opaque color printing material based on the calculated color offset 30A, as elaborated herein (e.g., in relation to FIG. 17).

As shown in the example of FIG. 4D, calibration module 40 may define a clarity enhancement region 50A-5 that may include a plurality of printing points. Calibration module 40 may modify a colorization vector value of one or more (e.g., each) PP of clarity enhancement region 50A-5 in relation to respective PPs of slice data element 50A.

For example, calibration module 40 may modify the colorization vector component values of PPs in clarity enhancement region 50A-5 so as to apply an enhanced clarity ratio 30C at that region. In other words, calibration module 40 may modify the colorization vector values of a plurality of printing points in clarity enhancement region 50A-5 so as to associate the one or more (e.g., the plurality) of PPs with one of the clear color and the one or more opaque colors at the enhanced clarity ratio 30C.

For example, assuming a PP (e.g., PP2) of a slice data element 50A is assigned an initial colorization vector value (e.g., opaque green [C, M, Y, K, W, T]=[50%, 0%, 50%, 0%, 0%, 0%]) by slicer 50. Analysis module 30 may calculate a color offset 30A between two or more components of the colorization vector (e.g., between a cyan component and a yellow component). Analysis module 30 may determine that due to the calculated color offset 30A (e.g., between the cyan component and the yellow component) a specific region may appear more cyan than the required normal value. Analysis module 30 may thus determine an enhanced clarity ratio 30C (e.g., a ratio of 80% to 20% between the opaque cyan and yellow components and the transparent component) that may be applied to the respective region, so as to mitigate color discrepancy (e.g., display the nominal, required color) in that region. Calibration module 40 may define a clarity enhancement region 50A-5 that may include one or more PPs (e.g., including PP2), and may include the defined clarity enhancement region 50A-5 in a calibrated data structure 41B.

Calibrated data structure 41B may include one or more modified colorization vector values pertaining to respective one or more PPs of clarity enhancement region 50A-5. The PPs of clarity enhancement region 50A-5 may have a colorization vector that may be modified according to the enhanced clarity ratio (e.g., [C, M, Y, K, W, T]=[40%, 0%, 40%, 0%, 0%, 20%]). In other words, clarity enhancement region 50A-5 may have a plurality of printing points, associated with one or more colors and with a clear printing material at the enhanced clarity ratio (e.g., 80% to 20% between the opaque cyan and yellow components and the transparent component).

Reference is now made to FIG. 4E, which is another schematic diagram depicting a slice of a shell representing a 3D object that may have been modified by an embodiment of the system 10, for mitigating color offset discrepancies in 3D printing systems, according to some embodiments.

Experimental results have shown that color difference discrepancies may be mitigated by combining a clarity enhancement region 50A-5 (e.g., as elaborated herein in relation to FIG. 4D) with an additional, internal white region 50A-6. White region 50A-6 may be adapted to reflect light back through clarity enhancement region 50A-5 and thus further mitigate color discrepancy.

As shown in FIG. 4E, calibration module 40 may define a white region comprising a plurality of printing points of white color, in a location adjacent to the color compensation region.

For example, calibration module 40 may produce a calibrated data structure 41B that may correspond to regions 50A-1, 50A-2 and 50A-3 of FIG. 4E, similar to the example of table 8, below:

TABLE 8

| Slice | Print point | PP Coordinates | colorization vector (e.g., [C, M, Y, K, W, T]) |
|---|---|---|---|
| S1 | PP1 (e.g., in 50A-5) | (X1, Y1) | [$C_1$, $Y_1$, $M_1$, $K_1$, $W_1$, $T_1$] |
| S1 | PP2 (e.g., in 50A-5) | (X2, Y2) | [$C_2$, $Y_2$, $M_2$, $K_2$, $W_2$, $T_2$] |
| S1 | PP3 (e.g., in 50A-5) | (X3, Y3) | [$C_3$, $Y_3$, $M_3$, $K_3$, $W_3$, $T_3$] |
| S1 | PP4 (e.g., in 50A-2) | (X4, Y4) | [0, 0, 0, 100%, 0, 0] |
| S1 | PP5 (e.g., in 50A-2) | (X5, Y5) | [0, 0, 0, 100%, 0, 0] |
| S1 | PP6 (e.g., in 50A-6) | (X6, Y6) | [0, 0, 0, 0, 100%, 0] |
| S1 | PP7 (e.g., in 50A-6) | (X7, Y7) | [0, 0, 0, 0, 100%, 0] |

In the example of table 7:

PP1, PP2 and PP3 may be included in a clarity enhancement region (e.g., 50A-5) that may be modified in relation respective PPs of slice 50A (e.g., region 50A-1 of FIG. 4A) to include a higher or enhanced clarity ratio 30C;

PP4 and PP5 may be included in a core region (e.g., 50A-2), and may be assigned a core color (e.g., an inexpensive color, marked in table 8 as black); and PP6 and PP7 may be included in a white region (e.g., 50A-6) that may be modified in relation to respective PPs of slice 50A (e.g., region 50A-1 of FIG. 4A) to include white PPs.

According to some embodiments, white region 50A-6 (e.g., PP6, PP7) may be located, in relation to clarity enhancement region 50A-5 (e.g., PP1, PP2, PP3), in a direction that is inward or toward a center of slice 50A. Thus, light may permeate through clarity enhancement region 50A-5 and may be reflected from white region 50A-6, so as to pass through clarity enhancement region 50A-5 again, further mitigate color discrepancy and enhancing color uniformity as may perceived by a viewer of the 3D printed object.

Reference is now made to FIG. 4F, which is another schematic diagram depicting a slice of a shell representing a 3D object that may have been modified by an embodiment of the system 10, for mitigating color offset discrepancies in 3D printing systems, according to some embodiments. As shown in FIG. 4F, embodiments of the invention may include combining solutions of mitigating color discrepancy for one or more regions of the 3D printed object. For example, as depicted in FIG. 4F, calibrated data structure 41B may include one or more modified slice 50A regions, such as a core region 50A-2, a transparent envelope region 50A-3, a color compensation region 50A-4, a clarity enhancement region 50A-5, and/or a white region 50A-6.

Figure 5B:
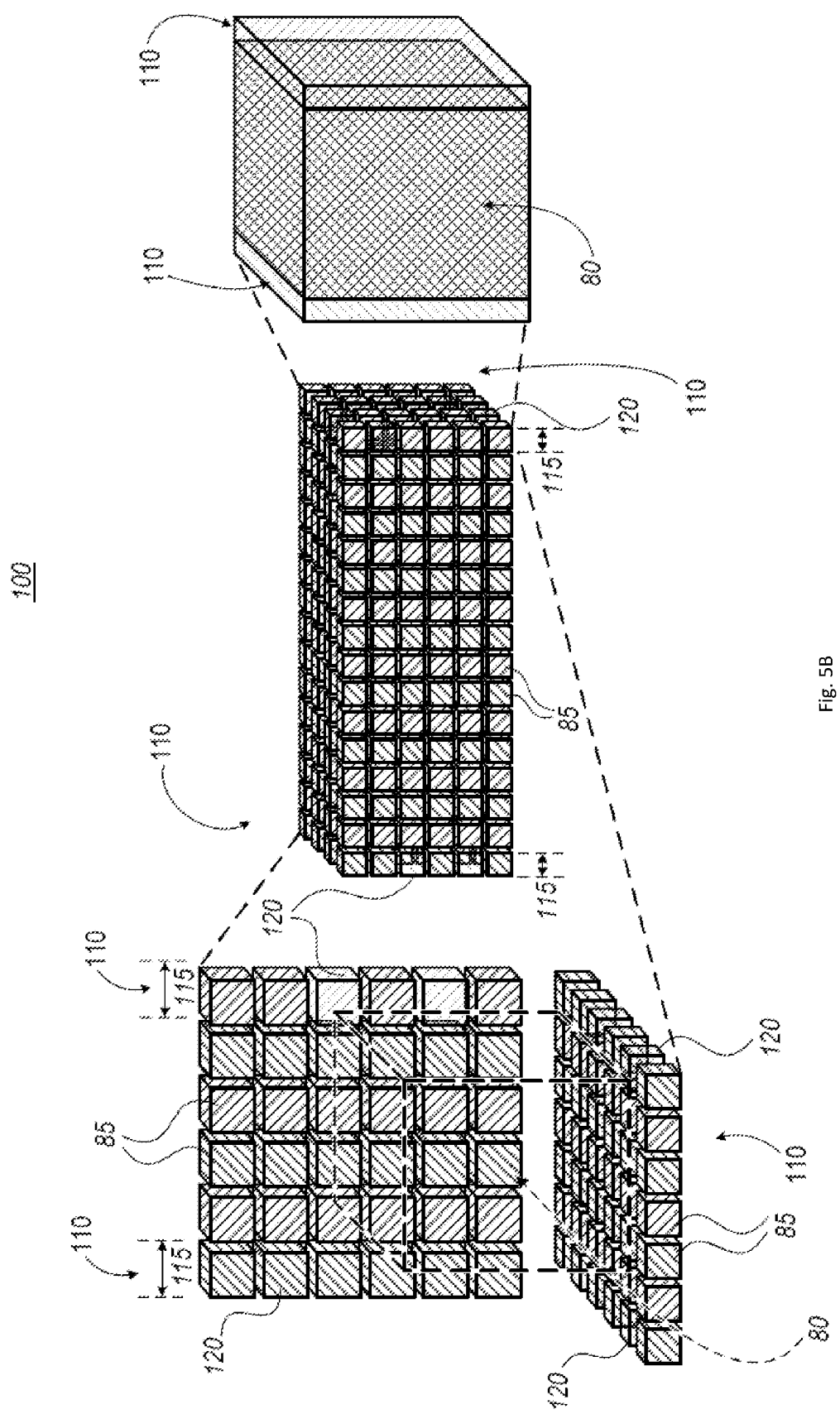

FIG. 5A and FIG. 5B are high level schematic illustrations of an inkjet-printed 3D object 100, according to some embodiments of the invention. Inkjet-printed 3D object 100 may include specified surface regions 110, e.g., at one or more sides of object 100, which are printed with enhanced clearness using a first ratio between clear to colored modeling materials, which is higher than a second ratio between clear to colored modeling materials which is used in a bulk volume 80 of 3D object 100. As illustrated schematically in FIG. 5A, surface regions 110 show layers of modeling material droplets which have a higher clear-to-color modeling material droplet ratio (e.g., referred to herein as a clarity ratio). While modeling material droplets 85 used to print bulk 80 of 3D object 100 have a certain (second) ratio between colored modeling materials (and optionally also clear modeling materials), certain surface regions 110 of object 100 may include a combination of modeling material droplets having higher clearness (e.g., higher transparency) than the combination of modeling material droplets 85, with clear, e.g., uncolored, transparent modeling material droplets 120 replacing all (see, e.g., FIG. 5A) or some (see, e.g., FIG. 5B) of colored modeling material droplets 85 in the printing of object 100 (with respect to uniform droplet composition). It is noted that the colored modeling material component may include at least two different colored modeling materials that are deposited separately, e.g., from different inkjet printing heads, to form a mixture, e.g., by digital combination of colored modeling materials within a layer of the object being printed. Color offset irregularities may result from spatially-inaccurate deposition of the droplets of the respective colored materials relative to one another within the layer. It is further noted that the apparent color of bulk 80 may be designated by a colored object layer, e.g., layer of colored materials that is deeper than the object surface, but not necessarily filling the full bulk of the object (which may lack designated colors due to its being internal and not affecting the visible color properties). The term bulk does not limit the invention to the full bulk of the object, but merely to a part thereof which is below the bulk surface.

FIG. 6 is a high level schematic illustration of an inkjet-printed 3D object 90 without enhanced clearness. Object 90 is printed uniformly, with the same composition or ratio of modeling material droplets 85 in the object's bulk 80 and the object's outer surfaces 95. However, errors in dispensing or printing of modeling material droplets 85 due to misalignment of print heads (e.g., also referred to herein as "registration" errors) may result in deviations of the color of outer surfaces 95 with respect to the color of object's bulk 80 as illustrated schematically in an exaggerated manner in a first color (e.g., blue) and a second color (e.g., red) of a mixed-color (e.g., purple) cube (the color difference is designated schematically by numeral 81).

In certain embodiments, denoting the color of the object bulk by CB and the colors of surface regions 110 with enhanced clearness by CM1 and CM2 (see, e.g., FIG. 5A, for different regions, possibly more or less than two); and denoting the colors of the sides of object 90 without enhanced clearness by CO1 and CO2 (corresponding to the locations of specified regions 110, see FIG. 6)—the color differences, denoted dE, are smaller with enhanced clearness than without modifications (e.g., CB−CM1<CB−CO1 and CB−CM2<CB−CO2). For example, the inventors have found out that depending on certain droplet placement errors resulting e.g., from printer head offset and/or block rotation, the color differences (CB−CO1 or CB−CO2) may reach 3 dE or even 5 dE in certain object placement directions without enhanced clearness (as in FIG. 6), while applying enhanced clearness, e.g., by deposition of a higher ratio of clear modeling material (as e.g., in FIG. 5A and FIG. 5B) reduces the appearance of color differences (CB−CM1 and CB−CM2) by half or more, e.g., to below 3 dE, such as to 2 dE, 1 dE or even 0 dE. An experimental example is presented in FIG. 9A through FIG. 9C below.

For example, Table 9 illustrates, in a non-limiting manner, the deviations from the nominal or required object color due to printing system inaccuracies, at a certain non-limiting printing configuration.

TABLE 9

Effects of different error sources on resulting color differences.

| Calibration | Contribution to error | Tolerance (X, Y machine) | Error (dE) | Impact Level | Impact |
| --- | --- | --- | --- | --- | --- |
| Drop weight (Head voltage) | Ca. 1.5 dE/2 volts. | ±0.6 Volt | Ca. ±0.5 dE | Low | Print-to-Print and Machine non-uniformity |
| Head offset | 5 dE/2 pixels, or one step from optimal position, left to right. | ±2 pixels of 1200 DPI (dots per inch) | Ca. ±5 dE | High | Left to right color difference (ca. 5 dE) |
| Block rotation | Ca. 1 dE/10 µ, front to back. | ±30 µ | ±3 dE | High | Front to back color difference (ca. 3 dE) |

TABLE 9-continued

Effects of different error sources on resulting color differences.

| Calibration | Contribution to error | Tolerance (X, Y machine) | Error (dE) | Impact Level | Impact |
|---|---|---|---|---|---|
| UV curing calibration (±10%) | No effect. | ±8% | | Very low | Print-to-Print and Machine non-uniformity |
| Number of scanning slices | No Effect. | | | Very low | |

In the illustrated example, two of the factors were shown to cause significant color differences along two different object directions. Clearly, in other objects, other printing machines and other printing settings, other errors may be prominent in causing color differences, and their impact level and the magnitude of the resulting color difference may vary. The printing methods disclosed herein may be adjusted to each specific case, enhancing clearness of specified surface regions 110 according to the estimated error sources and the expected resulting color differences.

The enhanced, or increased clearness may be applied to different specified depths 115 of surface regions 110, e.g., one, two or few droplet layers, and/or different specified thicknesses 115 of e.g., 1 mm, 0.5 mm etc. Clearly, layer thickness and the depth in terms of droplet layers are equivalent and related through the dimensions of the droplets (e.g., 1 mm may represent 15 droplets in certain settings). Thickness 115 of surface regions 110 may be determined with respect to multiple parameters such as the colors or combinations of colors involved and their parameters, the type(s) of modeling material used, the characteristics of the object's surface (e.g., matte or glossy, depending on the proximity or lack thereof of an adjacent supporting construction), the identified color differences without enhanced clearness (e.g., the larger the differences the deeper the enhanced clearness may be applied), the estimated extent of modeling material droplet placement errors of different kinds, etc.

In certain embodiments, color adjustments (e.g., color compensation) and/or clarity adjustments (e.g., clarity enhancement) may be applied across the surface of an object of varying surface color. Either same or varying ratios of clear modeling material components may be added to the varying colored modeling material components, or the varying colored modeling material components may be adjusted continuously over the object's surface, with respect to required color corrections, their orientation (see below) as well as their original color.

The increasing of clearness in surface regions 110 may be carried out in various manners, e.g., depositing some clear droplets 120 among more opaque colored droplets 85 (see schematic example in FIG. 5B), modifying the clearness of all surface regions 110 (see examples in FIG. 5A and FIG. 9A through FIG. 9C), forming a gradient of clearness enhancement with the depth into the object, etc. In certain embodiments, clearness may be enhanced by depositing a higher ratio of droplets of clear modeling materials to colored materials and/or increasing the ratio of clear modeling material droplets to colored material droplets to form a gradient of clarity. In other embodiments, the same ratio of clear to colored material is used in the whole thickness of the surface region (e.g., without using any gradient of clear to colored material). In certain embodiments, the non-uniformity of color on the outer surfaces of objects 90 may be reduced by randomly adding a clear material to the outer shell of objects 100 and/or objects 100 may have a predetermined enhanced peripheral clearness or transparency. The enhanced clearness or transparency may be determined with respect to the orientation of regions 110, e.g., with respect to the printing axes.

In certain embodiments, the degree to which clear material droplets 120 are deposited (in specified surface regions 110) may be determined according to a brightness of the colored components and/or according to a measured color difference or discrepancy between the specified surface regions at the interface regions, as well as according to any other object and/or printer parameters listed above. For example, the ratio between the clear to colored modeling material droplets 120 in specified object surface regions 110 may be between 1:1 and 4:1.

In certain embodiments, specified object surface regions 110 may be printed with 90% or 100% of clear modeling material, and/or a color aberrant surface may be mechanically removed to yield higher color uniformity, as disclosed, e.g., in FIG. 13B below.

In certain embodiments, specified surface regions 110 comprise at least two opposite sides of 3D object 100, e.g., along a direction of a registration error causing the color difference. In certain embodiments, specified surface regions 110 may be interface regions between attached 3D objects 100, (e.g., corresponding to interface regions 95 showing color differences in FIG. 7). For example, the 3D objects may be different parts of an object to be assembled and are printed simultaneously with different orientations of their respective interface regions within the printing system during printing. FIG. 7 exemplifies color differences between object edges, when the objects have been printed with two different X-Y orientations on the printing tray.

FIG. 8 is a high-level schematic illustration of a modification 210 of a given color model to improve color uniformity at the object edges, according to some embodiments of the invention. As illustrated schematically in a two-dimensional (2D) manner, errors in the printing process (e.g., X, Y drop placement inaccuracies, which are highly exaggerated in the illustration) may yield objects 90 having edges 95 with a different color than the object's bulk 80 and/or color non-uniformity at the edges of objects 90, even though the same modeling material droplet composition or ratio of modeling material droplets is used throughout object 90. The color differences are shown in a very exaggerated manner to reach a first color (e.g., blue) and a second color (e.g., red) with respect to object 90, realistic color difference values which were observed may reach e.g., 5 dE to 10 dE or more, as exemplified in FIG. 7 showing brown-green differences.

The inventors have found out that making edges 110 more clear, or more transparent, e.g., using a smaller proportion of colored components to clear components, creates an effect that reduces the apparent color difference with respect to bulk 80. The reasons for this effect may be multiple, such as, without being bound to theory, reduction of the color deviation at the object edges, at which the registration error manifests itself most strongly and/or refraction of colored light from the object's bulk through the clearer regions which reduces the color difference with respect to the bulk, and/or user viewing inside objects 100 and observing regions which appear more uniform than the edges. For example, while object bulk 80 may be printed with a purple color resulting from digital deposition of 50% cyan and 50% magenta modeling material droplets, object edges 110 may be produced with a hue of purple resulting from 25% cyan and 25% magenta, with the remaining 50% being clear modeling material, while still preserving the ratio between the colored modeling materials as in object bulk 80. See also FIG. 13A for an alternative or complementary application.

Figure 9A:
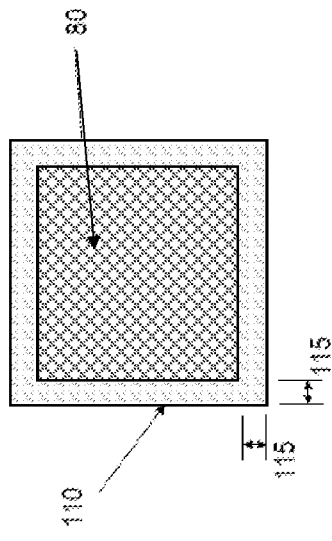
FIG. 9A through FIG. 9C provide examples for the reduction of color differences at the object edges by increasing the clearness of the edges, according to some embodiments of the invention.
Figure 9C:
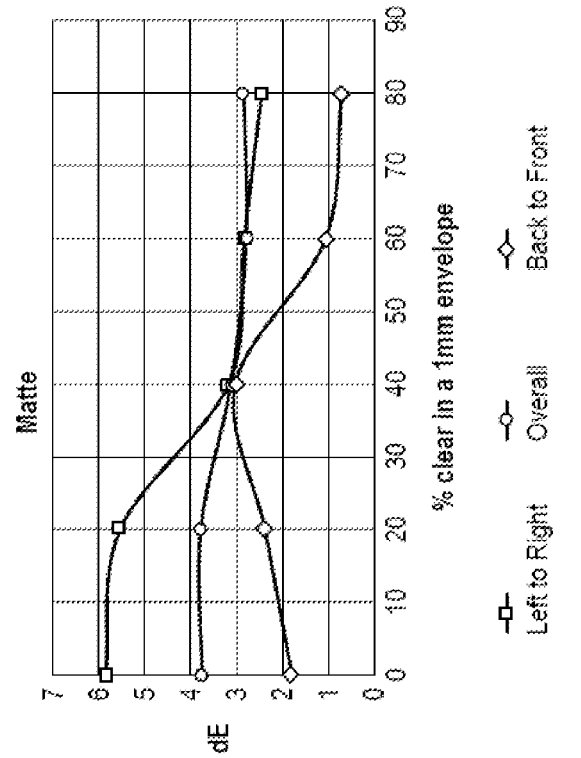
Figure 9B:
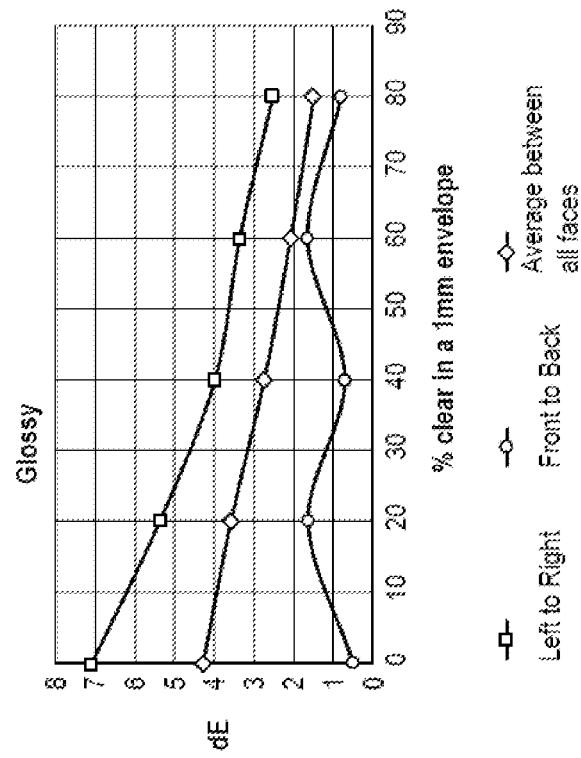

FIG. 9A through FIG. 9C provide examples for the reduction of color differences at the object edges by increasing the clearness of the edges, according to some embodiments of the invention. FIG. 9A illustrates schematically in 2D the experimental color model of object 100 used in the experiment, of colors cyan, magenta and white in equal proportions, with a variable clear modeling material added stepwise to object edge 110 as a 1 mm thick (115) envelope. For example, at 20% clear component at envelope 110, each of cyan, magenta and white components is deposited at 80%/3 of modeling material droplets 120 (the ratio of clear to colored components being 1:4), at 60% clear component at envelope 110, each of cyan, magenta and white components is deposited at 40%/3 of modeling material droplets 120 (the ratio of clear to colored components being 3:2), and so forth.

FIG. 9B and FIG. 9C present the dependence of the color difference (in dE) between object envelope 110 and object bulk 80 at varying values of the ratio between clear to colored components, between 0 and 80% and 20% steps—for glossy and matte object surface finishes. In both cases, significant reduction in the color difference is achieved by enhancing edge clearness. The graphs in FIG. 9B and FIG. 9C present the average color difference as well as the color differences in two directions across the object, namely left to right and front to back, the difference between which indicates the different spatial effects of modeling material droplet deposition offset.

Figure 10:
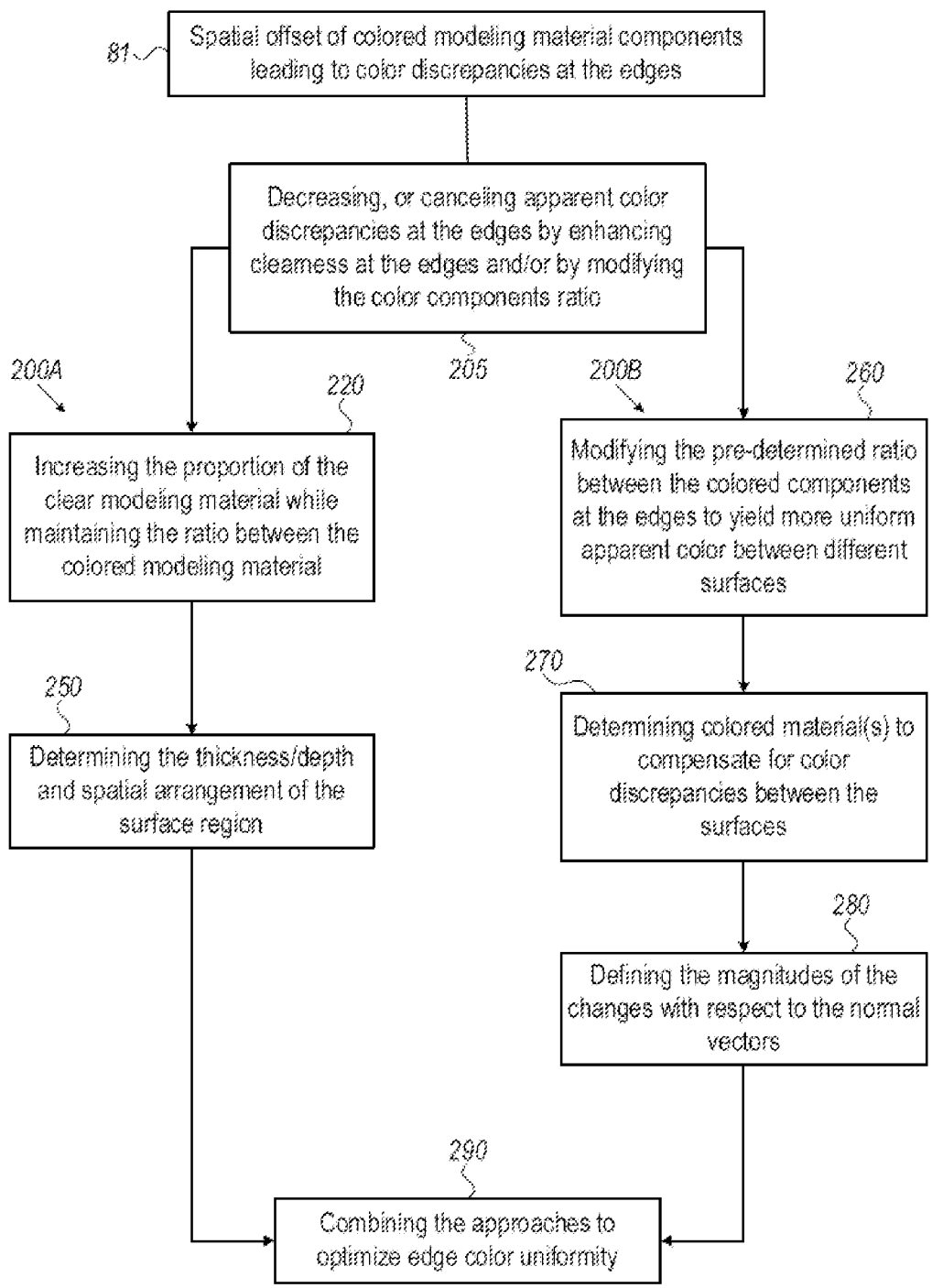
FIG. 10 is a high-level flowchart illustrating a method to increase edges color uniformity, according to some embodiments of the invention.

FIG. 10 is a high-level flowchart illustrating a method 200 to increase edges color uniformity, according to some embodiments of the invention. The method stages may be carried out with respect to 3D objects 100 described above and a corresponding 3D printing system, which may be configured to implement method 200. Method 200 may be at least partially implemented by at least one computer processor, e.g., in the 3D printing system. Certain embodiments comprise computer program products comprising a computer readable storage medium having computer readable program embodied therewith and configured to carry out the relevant stages of method 200. Certain embodiments comprise a 3D-printer comprising the any of the disclosed computer program product and/or configured to perform any of disclosed method(s) 200. Method 200 may comprise the following stages, irrespective of their order.

Method 200 comprises handling spatial offset of colored modeling materials leading to color discrepancies at the object's edges (designated schematically by numeral 81 in FIG. 10 and illustrated in the schematic example of FIG. 6) by canceling color discrepancies at the edges through enhancing clarity at the edges (method 200A) and/or modifying the colored modeling materials ratio (method 200B). Method 200 may comprise steps from method 200A and/or method 200B.

Method 200 may comprise decreasing or canceling apparent color discrepancies at the edges by enhancing clearness at the edges and/or by modifying the color components ratio (stage 205).

In certain embodiments, method 200A of inkjet-printing a 3D object may comprise printing specified surface regions of the 3D object using a first ratio between clear to colored modeling materials, wherein the first ratio is higher than a second ratio between clear to colored modeling materials which is used in a bulk volume of the object (stage 210).

In certain embodiments, method 200A of inkjet-printing a 3D object from a given color model that specifies a spatial color distribution for corresponding modeling material droplets may comprise increasing the proportion of the clear modeling material while maintaining the ratio between the colored modeling material (stage 220) and/or increasing a ratio between clear to colored modeling material droplets in specified object surface regions of the color model, to enhance color uniformity at a surface of the 3D object (stage 221).

In either of the embodiments of method 200A, the specified surface regions may comprise at least two opposite sides of the 3D object and may have a specified thickness of 1 mm, 0.5 mm or less, and/or a specified depth from the object's surface of one, two, five, ten or more modeling material droplets. In various embodiments, the ratio between the clear to colored modeling material droplets in the specified object surface regions may be between 1:1 and 4:1.

In certain embodiments, method 200A may comprise determining the specified surface regions as interface regions between 3D objects to be attached to each other (stage 230), such as objects which are parts of an assembled object and are printed simultaneously with different orientations of their interface regions in the printing system.

In certain embodiments, method 200A may comprise determining the ratio between the clear to colored modeling material droplets in the specified object surface regions according to a brightness of the colored components (stage 240) and/or determining the ratio between the clear to colored modeling material droplets in the specified object surface regions according to a measured color discrepancy between the specified surface regions at the interface regions (stage 245). Method 200A may further comprise determining the thickness/depth and spatial arrangement of the surface region (stage 250).

While method 200A comprises modifying the ratio between clear to colored modeling materials, method 200B comprises attenuating or canceling color offsets at edges of an 3D object inkjet-printed from a given color model that specifies a spatial color distribution for corresponding modeling material droplets—by modifying, in the given color model, a ratio between droplets of colored modeling materials at specified surface regions at the edges. Method 200B may comprise modifying the pre-determined ratio between the colored components at the edges to yield more uniform apparent color between different surfaces (stage 260). Method 200B may further comprise determining colored material(s) to compensate for color discrepancies between the surfaces (stage 270).

In certain embodiments, method 200B may comprise designing apparent compensatory color differences that, while modifying the color model into having virtual color differences at the object edges, result in final 3D-printed objects with more color-uniform edges, as the color model modifications are designed to enhance at the edges the color component(s) which are attenuated by the color offsets. For example, referring to FIG. 5A as a schematic example, the apparent compensatory color differences may be designed to enhance a first color (e.g., blue) modeling material component(s) in the color model on the right-hand edge of the object, and enhance a second color (e.g., red) modeling material component(s) in the color model on the left-hand edge of the object, to yield enhancement of the complementary color, which was attenuated by the color offset. In certain embodiments, method 200B may comprise defining the magnitudes of the changes with respect to the normal vectors (stage 280), e.g., spatially with respect to the spatial location and magnitude of the color offset which is to be compensated for.

In certain embodiments, method 200B may comprise printing samples and estimating color irregularities on different surfaces of the samples (stage 262), e.g., printing 3D objects composed of surfaces, such as cubes, prisms or pyramids, to estimate color irregularities on their surfaces in different orientations with respect to the 3D printing tray. Surfaces of the samples may be identified as being deviant in color from prescribed requirements. It is noted that color requirements may be provided using one scale, e.g., Pantone, while the design and/or printing process may utilize a different scale, e.g., CIE Lab relating to the CAD color model and/or colors relating to the modelling materials. The difference between the scales may also result in color irregularities which may be corrected by disclosed methods. Color irregularities may be directly measured by optical equipment such as colorimeter(s), and the dimensions and form of the samples may be determined respectively. In certain embodiments, color irregularities may be directly measured on the 3D-printed object, e.g., as part of a quality assurance process, and be corrected upon identification. The sample(s) or object used for estimating color irregularities may be related in shape and size to the optical equipment used.

Method 200B may further comprise deriving color adjustments, related to the surfaces, to compensate for the color irregularities (stage 272), for example using additional samples with experimental color compensation, and/or using CAD tools for converting color measurements to color model modifications (see e.g., FIG. 16 below).

In certain embodiments, method 200B may comprise deriving corresponding vectoral color adjustments (stage 282), which comprise color corrections that relate to the spatial orientation of the surface (e.g., part of the 3D model). For example, in case the color irregularities are spatially oriented, e.g., along a specific direction, color corrections may be applied in that direction and not in orthogonal directions, while partial color correction may be applied to diagonal surfaces (see, e.g., FIG. 11 and FIG. 16 herein).

Method 200B may further comprise applying the vectoral color adjustments to the color model (stage 284) to apply the appropriate correction and remove the color irregularities. It is noted that 3D objects with a complicated surface topography may require color corrections depending on the color at each point and on the spatial orientation at each point, resulting in high-resolution and accurate color corrections.

In certain embodiments, method 200B may comprise inkjet-printing a 3D object layer by layer by printing at least one sample with a plurality of flat surfaces at specified spatial orientations, measuring colors of the flat surfaces, deriving, from the measured colors, color irregularities between the flat surfaces, modifying color parameters of a received CAD color model, used to 3D-print the object, to cancel out the derived color irregularities by applying a vectoral correction of colors specified by the received CAD color model according to spatial relations between normals specified by the received CAD color model and the specified spatial orientations of the flat surfaces, and 3D-printing the object with the modified color parameters. The sample(s) may comprise multiple geometric objects including any of cubes, prisms and pyramids. Method 200B may further comprise configuring the sample(s) to comply with size requirements of optical equipment used for the color measurements. In certain embodiments, the sample(s) may be related to the received CAD color model, e.g. method 200B may further comprise using the 3D object or part(s) thereof as the sample(s). In certain embodiments, the application of the vectoral correction relates the specified spatial orientations of the flat surfaces to the normals specified by the received CAD color model by projection of the latter on the former.

Method 200 may further comprise combining the approaches of methods 200A and 200B to optimize edge color uniformity by applying both described means, in various combinations of the corresponding stages (stage 290).

FIG. 11 is a high-level schematic illustration of edges color correction methods 200 (200A, 200B) that are applied separately or simultaneously to improve color uniformity of edges of 3D inkjet-printed objects, according to some embodiments of the invention. Objects 100 are shown in a highly schematic manner as circles with strongly exaggerated color offsets, representing corresponding spheres or any other object shape, to which similar principles are applicable. FIG. 11 illustrates schematically enhancing the object clearness at its circumference or part(s), surface regions, thereof (method 200A), e.g., within an envelope 116 (having thickness 115); and modifications of the ratios between colored modeling materials at the object edges, leading to apparent color differences at the color model level and (illustrated schematically as changes in color model 105 with respect to given color model 86) actual increased color uniformity of edges of the 3D object (method 200B), possibly carried out in a vectoral manner, as illustrated schematically by the arrows having different sizes (clearly in a 3D model, the modification vectors may have varying directions and magnitudes in 3D). Objects 100 may be designed using any combinations of model modifications and clearness enhancements.

In certain embodiments, method 200A may be implemented at the level of the 3D printer, without consideration of the specifics of the color model used to print the object. In method 200A, clear modeling material droplets 120 may be added to assigned surfaces or parts thereof to enhance color uniformity of different object surfaces.

In certain embodiments, method 200B may be implemented at the level of the system handling the color model, e.g., the computer used to define the 3D-printing process according to the CAD color model. In method 200B, color components may be adjusted to reduce or cancel color irregularities or discrepancies on different surfaces of the object.

Methods 200A and 200B may be at least partially combined, or applied independently, depending on the type of the model, the observed color irregularities, production specifications etc.

Figure 12B:
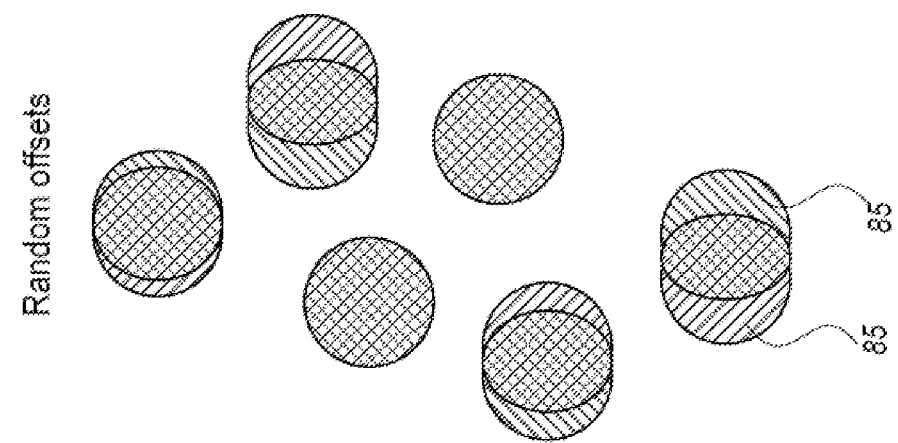
FIG. 12A and FIG. 12B are high level schematic illustrations of modeling material droplet distributions, according to some embodiments of the invention.
Figure 12A:
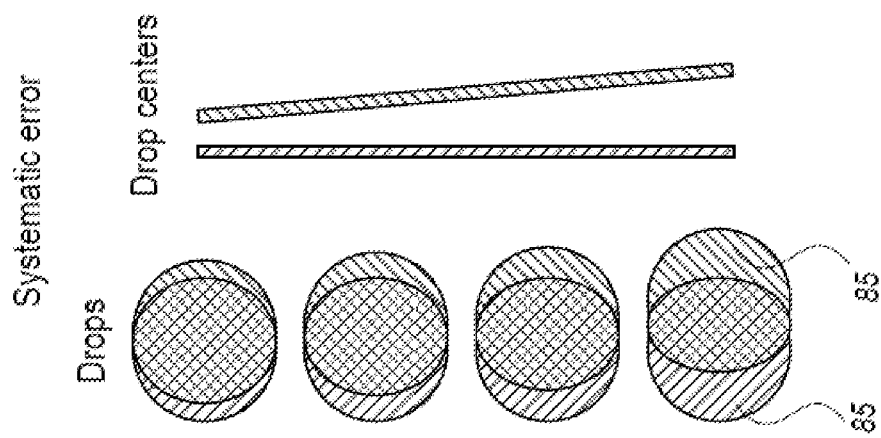

FIG. 12A and FIG. 12B are high level schematic illustrations of modeling material droplet distributions, according to some embodiments of the invention. In certain embodiments, method 200 may further comprise deriving a distribution of material droplets 85, e.g., experimental and/ or by analysis of registration errors of the 3D printer, e.g., print heads alignment, and adjusting the distribution of clear modeling material droplets 120 to compensate for object regions in which the disparity between the colored material droplets is large and/or modify the color model in object regions in which the disparity between the colored material droplets is significant.

FIG. 13A through FIG. 13E are high level schematic illustrations of multiple approaches for correcting edges color irregularities, according to some embodiments of the invention.

FIG. 13A represents a 3D printed object that may not have overgone mitigation of color discrepancies. As shown in FIG. 13A, voxels of 3D printed material may be organized (e.g., due to print head misalignment) such that a first color (e.g., red) may be concentrated on a first edge of the 3D printed object and a second (e.g., blue) may be concentrated on a second, opposite edge of the 3D printed object. Hence, as shown by arrows 96, the colors as perceived on the first and second edges may be different.

FIG. 13B illustrates schematically application of a higher ratio of clear modeling material droplets 120 (e.g., applying an enhanced clarity ratio) at edge surfaces 115 of the 3D object (e.g., corresponding to enhanced clarity region 50A-5 of FIG. 4D), e.g., arbitrarily at a specified proportion (indicated as method variant 200A-1), or systematically, by the 3D printing system itself. In certain embodiments, dispersed clear modeling material droplets 120 may provide "windows" to the interior of 3D object which may let through the internal color and enhance the appearance of color uniformity over the surfaces of the 3D object—compensating for color irregularities 96 (indicated schematically) and thus yielding more uniform surface colors 111 (indicated schematically).

FIG. 13C illustrates schematically replacing droplets 85 at edge surfaces 115 of the 3D object, by layer 115 of clear modeling material droplets 120 (e.g., corresponding to transparent envelope region 50A-3 of FIG. 4F), possibly with the proportion of clear modeling material droplets 120 increased to 80%, 90% or even 100%, providing an external clear, transparent envelope (indicated as method variant 200A-2). For example, in case modeling material droplets 85 intermix within the object bulk, making the external layer clear may reduce or remove the color irregularities.

FIG. 13D illustrates schematically removing a certain depth of surface layer 115 (indicated as method variant 200A-3). Experimental results show that such removal of an external layer of a printed 3D object may also remove the color irregularities FIG. 13E illustrates schematically modification of a color ratio (e.g., applying a compensated color ratio) between two or more 3D printing materials at edge surfaces 115 of the 3D object (e.g., corresponding to color compensation region 50A-4 of FIG. 4C), indicated as method variant 200B. As elaborated herein, the compensated color ratio may enhance the appearance of color uniformity over the surfaces of the 3D object, compensating for color irregularities 96 (indicated schematically) and thus yielding more uniform surface colors 111 (indicated schematically). The different color printing material droplets may be applied arbitrarily at a specified proportion, or systematically, by the 3D printing system itself.

FIG. 14A through FIG. 14C and FIG. 15A through FIG. 15C are high level schematic illustrations of multiple approaches to modeling material droplet distributions and corresponding correction of color irregularities, according to some embodiments of the invention. In various configurations, the characteristics of the droplet distribution may vary, and corresponding different applications of disclosed methods 200 may be implemented. FIG. 14A and FIG. 15A illustrate schematically a random distribution of points, having variable offsets, all in one direction. FIG. 14B and FIG. 15B illustrated schematically a regular and uniform distribution of points, having similar offsets, in the same direction. FIG. 14C and FIG. 15C illustrate schematically a random distribution of points, having similar offsets, in the same direction. FIG. 14A through FIG. 14C illustrate schematic droplet distributions, while FIG. 15A through FIG. 15C illustrate similar distributions, under the assumption of droplet intermixing that forms object bulk 80 which is more uniform in color than the object surfaces. Method 200 may be adjusted to yield a required optical effect depending on the droplets' actual distribution.

In certain embodiments, method 200B may comprise printing samples and estimating color irregularities on different surfaces of the samples (stage 262), e.g., printing 3D objects composed of surfaces, such as cubes, prisms or pyramids, to estimate color irregularities on their surfaces in different orientations with respect to the 3D printing tray. Surfaces of the samples may be identified as being deviant in color from prescribed requirements. It is noted that color requirements may be provided using one scale, e.g., Pantone, while the design and/or printing process may utilize a different scale, e.g., CIE Lab relating to the CAD color model and/or colors relating to the modelling materials. The difference between the scales may also result in color irregularities which may be corrected by disclosed methods. Color irregularities may be directly measured by optical equipment such as colorimeter(s), and the dimensions and form of the samples may be determined respectively. In certain embodiments, color irregularities may be directly measured on the 3D-printed object, e.g., as part of a quality assurance process, and be corrected upon identification. The sample(s) or objects used for estimating color irregularities may be related in shape and size to the optical equipment used.

Figure 16:
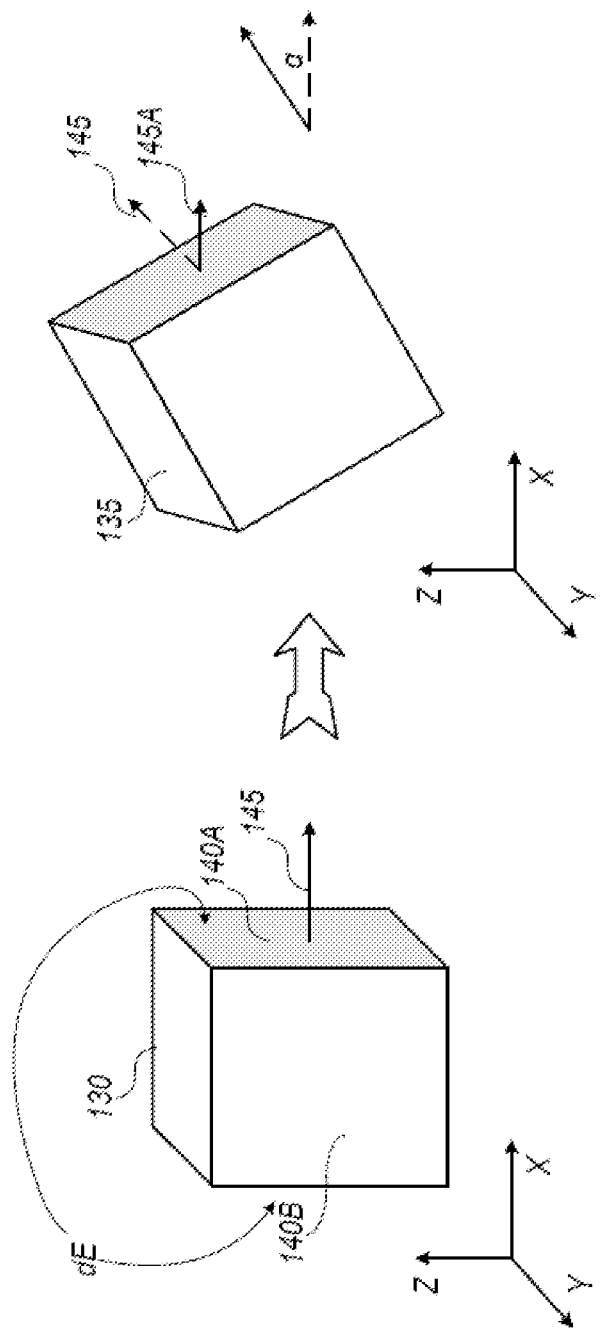
FIG. 16 is a schematic high-level illustration of a sample used to estimate color irregularities and of an object element with corresponding vectoral color correction, according to some embodiments of the invention.

FIG. 16 is a schematic high-level illustration of a sample 130 used to estimate color irregularities and of an object element 135 with corresponding vectoral color correction 145A, according to some embodiments of the invention. Samples 130, such as cubes, prisms or pyramids, may be 3D-printed to estimate color irregularities (denoted dE) on different surfaces of the samples when compared to a reference color, indicated schematically by numerals 140A, 140B (indicating different colors). Samples 130 may be used to calculate a vectoral color correction 145 which indicates the magnitude of color adjustment which is required to compensate for the color irregularity dE, and the direction along which the color correction is applied (indicated as direction "X" in FIG. 16). When applying the color correction to the 3D-printed object, the direction of the surface of the object (e.g., along the normal vector) at each point may be considered in calculating the color correction. For example, inclined object element 135, representing a surface of the object tilted at an angle α, may be assigned only a partial correction 145A with respect to full correction 145, as it is not fully in the direction of the color offset and therefore may suffer from less color irregularity. Partial corrections 145A may be calculated all over the surface of the 3D-printed object, with respect to the respective orientation of its surface. Multiple samples 130 may be used to estimate color irregularities along multiple spatial directions, to enhance the accuracy of partial corrections 145A.

FIG. 8 further elaborates and demonstrates instances of applying color corrections 145A.

Figure 17:
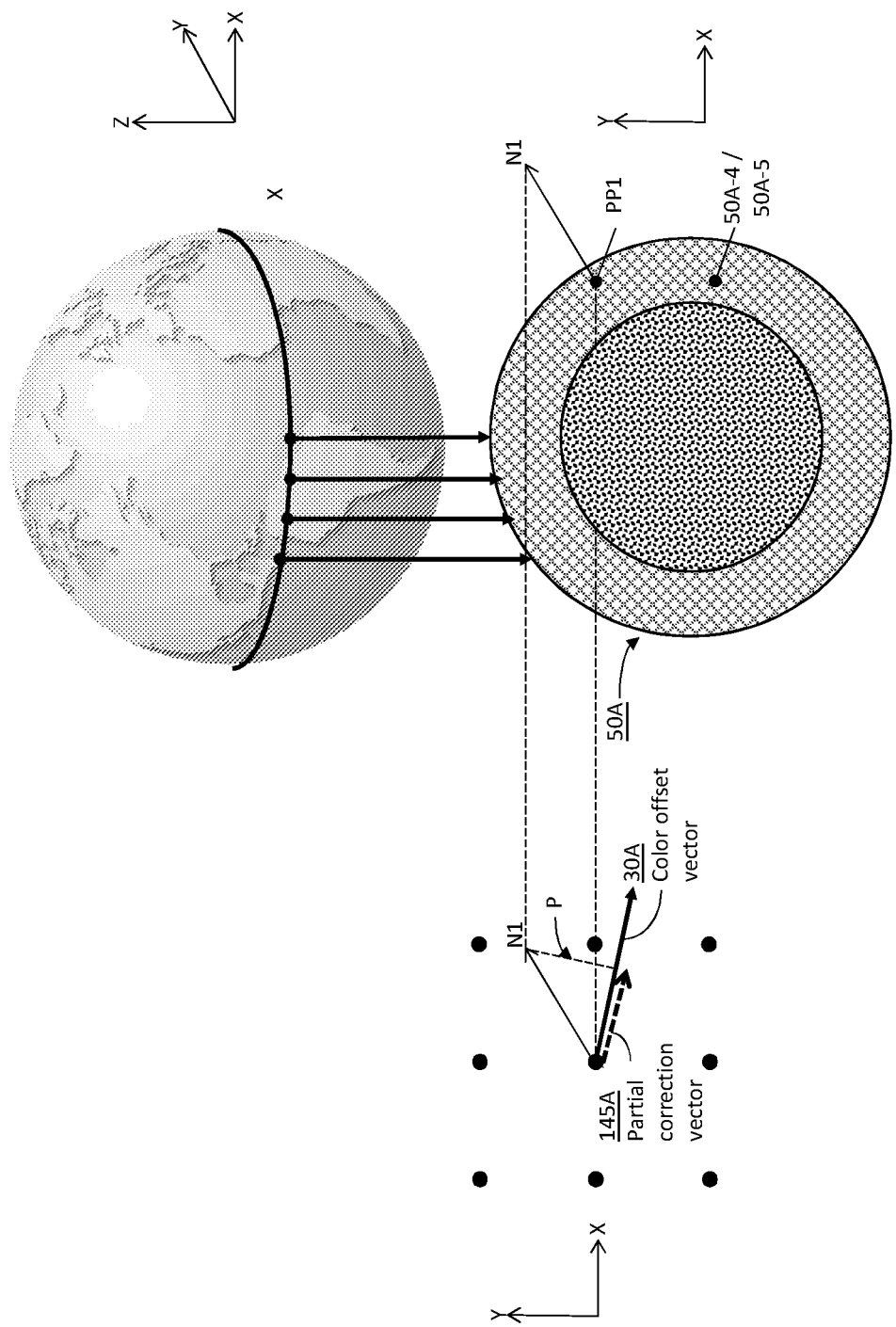
FIG. 17 is a schematic diagram depicting a method of vectoral correction that may be implemented by a system for mitigating color discrepancy, according to some embodiments of the invention.

Reference is now made to FIG. 17 which is a schematic diagram depicting a method of vectoral correction that may be implemented by a system for mitigating color discrepancy, according to some embodiments of the invention.

As elaborated herein (e.g., in relation to FIG. 4C and/or FIG. 4D), embodiments of the present invention may include applying one or more of a color compensation solution and/or a clarity enhancement solution to enhance uniformity of color on a surface of a 3D printed object.

As elaborated herein, the color compensation solution may include:
calculating (e.g., by analysis module 30) a compensated color ratio 30B between two or more colors (e.g., components of a colorization vector such as a CMYKWT vector); and
attributing or assigning (e.g., by calibration module 40) the compensated color ratio 30B to PPs of a color compensation region 50A-4 of one or more slices 50A.

In a similar manner, as elaborated herein, the clarity enhancement solution may include:
calculating (e.g., by analysis module 30) an enhanced clarity ratio 30C between one or more colors (e.g., CMYKW components of a CMYKWT colorization vector and a transparent printing material (e.g., corresponding to component T of the CMYKWT vector); and
attributing or assigning (e.g., by calibration module 40) the enhanced clarity ratio 30C to PPs of a clarity enhancement region 50A-5 of one or more slices 50A.

Embodiments of the invention may be configured to apply one or more of the color enhancement solution and color compensation solution in manner that takes the shape of the 3D printed object into account. In some embodiments, the correction may depend upon a projection of a normal of a surface of the 3D model upon the color offset vector 30A.

For example, in a 3D printed object that is a cube, the same correction (e.g., of color compensation and/or clarity enhancement) may be applied evenly over a face of the printed cube. In another example, where the 3D printed object is a hemisphere (e.g., printed with its base parallel to the XY plane), the correction may be applied gradually. Assume, for example, that the color offset vector 30A is aligned along the Y axis. In this condition:
a first printing point (PP) on the hemisphere that has a normal vector that is aligned with the
X axis will not be applied any correction;
a second PP on the hemisphere that has a normal vector that is aligned with the Y axis will be applied a maximal correction; and
a third PP between the first PP and second PP will be applied a correction depending on its relative location.

According to some embodiments of the present invention, calculating the compensated color ratio for at least one PP (e.g., PP1) of the color compensation region 50A-4 may include the following steps.

Analysis module 30 may receive (e.g., from slicer module 50) a target colorization vector (e.g., TCV element 51 of FIG. 2) pertaining to the at least one PP. TCV 51 may include a nominal color ratio (e.g., element 52 of FIG. 2) between two or more colors (e.g., components of TCV 51). For example, in a TCV 51 that is a CMYKW vector where respective component values [C, M, Y, K, W] are [50%, 0%, 50%, 0%, 0%], a nominal color ratio 52 between the C (cyan) component and Y (yellow) component is 1:1.

Analysis module 30 may calculate a base color compensation parameter according to the color offset vector 30A. For example, a direction color offset 30A may indicate an inclination of color discrepancy in relation to the nominal color (e.g., too much cyan or too much yellow), whereas the extent or size of color offset vector 30A may indicate a severity of color discrepancy. For example:
a large color difference 35A' in favor of the C component may yield a first color offset vector 30A, that may be inclined in a first direction, and may have a large amplitude or size;
a small color difference 35A' in favor of the C component may yield a second color offset vector 30A, that may be inclined in the first direction, and may have a small amplitude or size;
a large color difference 35A' in favor of the Y component may yield a third color offset vector 30A, that may be inclined in a second direction, and may have a large amplitude or size; and
a small color difference 35A' in favor of the Y component may yield a fourth color offset vector 30A, that may be inclined in the second direction, and may have a small amplitude or size.

Analysis module 30 may thus obtain (e.g., from a first lookup table) a base color compensation parameter that may correspond to color offset vector 30A. An example of content of the lookup table, pertaining to the same example ([C, M, Y, K, W]=[50%, 0%, 50%, 0%, 0%]) is provided below in table 9:

TABLE 9

| color offset vector (COV) 30A | base color compensation parameter |
|---|---|
| COV 1 | +20% |
| COV 2 | +10% |
| COV 3 | −10% |
| COV 4 | −20% |

In the example of table 9, a large color difference 35A' in favor of the C component may yield the first color offset vector 30A (e.g., COV1). In this condition, the base color compensation parameter may be 20% in favor of the Y component. In another example, a small color difference 35A' in favor of the Y component may yield the fourth color offset vector 30A (e.g., COV 4). In this condition, the base color compensation parameter may be 20% in favor of the Y component.

The terms 'large' and 'small' are used in this context to refer to empirical values that may depend on a plurality of parameters (e.g., a type and/or color of one or more printing materials) and may be defined and/or calibrated through experimentation.

As explained herein and as shown in FIG. 17, embodiments of the invention may apply a correction (e.g., a color compensation) depending upon a projection of a normal of a surface of the 3D model upon the color offset vector 30A.

According to some embodiments of the invention, calibration module 40 may calculate a normal (marked 'N1' in FIG. 17) to a surface of the model at the relevant point (e.g., P1). Calibration module 40 may subsequently calculate a projection (marked 'P' in FIG. 17) of normal N1 on color offset vector 30A. As shown in FIG. 17, the result of this projection is a partial correction vector 145A, that is aligned with color offset vector 30A.

According to some embodiments of the invention, calibration module 40 may calculate the compensated color ratio as a function of the base color compensation parameter, the nominal color ratio and the calculated projection (e.g., the relative size of vector 145A in relation to color offset vector 30A)

For example, pertaining to the same CMYKW example ([C, M, Y, K, W]=[50%, 0%, 50%, 0%, 0%]), and assuming that:
(a) a large color difference 35A' in favor of the C component has yielded the first color offset vector 30A (e.g., COV1), thus setting (e.g., via lookup table 9) a base color compensation parameter value of 20%; and
(b) the relative size of vector 145A in relation to color offset vector 30A is ½.

In this condition, the compensation of color ratio may be equal to the product of the base color compensation parameter value (e.g., 20% in favor of the Y component) and the relative size of vector 145A in relation to color offset vector 30A (e.g., ½). Thus, in this condition, the compensation of color ratio may be equal to 10% in favor of the Y component.

Hence, in this condition, the compensated color ratio between the C component and Y component may be 0.9 to 1.1, and the respective target colorization vector may be modified accordingly to be [45%, 0%, 55%, 0%, 0%].

According to some embodiments of the present invention, calculating the enhanced clarity ratio for at least one PP (e.g., PP1) of the clarity enhancement region 50A-5 may include the following steps.

Analysis module 30 may receive (e.g., from slicer module 50) a target colorization vector (e.g., TCV element 51 of FIG. 2) pertaining to the at least one PP. TCV 51 may include a nominal clarity ratio (e.g., element 53 of FIG. 2) between one or more colors (e.g., components of TCV 51) and a transparent printing material component of TCV 51. For example, in a TCV 51 that is a CMYKWT vector, where respective component values [C, M, Y, K, W, T] are [40%, 0%, 40%, 0%, 0%, 20%], a nominal clarity ratio 52 between the T (Transparent) component and the C (cyan) and Y (yellow) components is 0.2 to 0.8.

Analysis module 30 may calculate a base clarity enhancement parameter according to the color offset vector 30A. For example, as elaborated herein, a direction color offset 30A may indicate an inclination of color discrepancy in relation to the nominal color (e.g., too much cyan or too much yellow), whereas the extent or size of color offset vector 30A may indicate a severity of color discrepancy.

Analysis module 30 may thus obtain (e.g., from a second lookup table) a base clarity enhancement parameter that may correspond to color offset vector 30A. An example of content of the lookup table, pertaining to the same example ([C, M, Y, K, W, T]=[40%, 0%, 40%, 0%, 0%, 20%]) is provided below in table 10:

TABLE 10

| color offset vector (COV) 30A | base clarity enhancement parameter |
|---|---|
| COV 1 | +20% |
| COV 2 | +10% |
| COV 3 | +10% |
| COV 4 | +20% |

In the example of table 10, a large color difference 35A' in favor of any component (e.g., C component or Y component) may yield a base clarity enhancement parameter of 20%. In another example, a small color difference 35A' in of any component (e.g., C component or Y component) may yield a base clarity enhancement parameter of 10%. Again, the terms 'large' and 'small' are used in this context to refer to empirical values that may depend on a plurality of parameters (e.g., a type and/or color of one or more printing materials) and may be defined and/or calibrated through experimentation.

As explained herein and as shown in FIG. 17, embodiments of the invention may apply a correction (e.g., a clarity enhancement) depending upon a projection of a normal of a surface of the 3D model upon the color offset vector 30A.

According to some embodiments of the invention, calibration module 40 may calculate a normal (marked 'N1' in FIG. 17) to a surface of the model at the relevant point (e.g., P1). Calibration module 40 may subsequently calculate a projection (marked 'P' in FIG. 17) of normal N1 on color offset vector 30A. As shown in FIG. 17, the result of this projection is a partial correction vector 145A, that is aligned with color offset vector 30A.

According to some embodiments of the invention, calibration module 40 may calculate the enhanced clarity ratio as a function of the base clarity compensation parameter, the nominal clarity ratio and the calculated projection (e.g., the relative size of vector 145A in relation to color offset vector 30A).

For example, pertaining to the same CMYKWT example ([C, M, Y, K, W, T]=[40%, 0%, 40%, 0%, 0%, 20%]), and assuming that:
(a) a large color difference 35A' in favor of the C component has yielded the first color offset vector 30A (e.g., COV1), thus setting (e.g., via lookup table 10) a base clarity enhancement parameter value of 20%; and
(b) the relative size of vector 145A in relation to color offset vector 30A is ½.

In this condition, the enhancement of clarity ratio may be equal to the product of the base clarity enhancement parameter value (e.g., 20%) and the relative size of vector 145A in relation to color offset vector 30A (e.g., ½). Thus, in this condition, the enhancement of clarity ratio may be equal to 10%. Hence, in this condition, the enhanced clarity ratio between the T component and the C and Y components may be 0.22 to 0.78, and the respective target colorization vector may be modified accordingly to be [39%, 0%, 39%, 0%, 0%, 22%].

Figure 18:
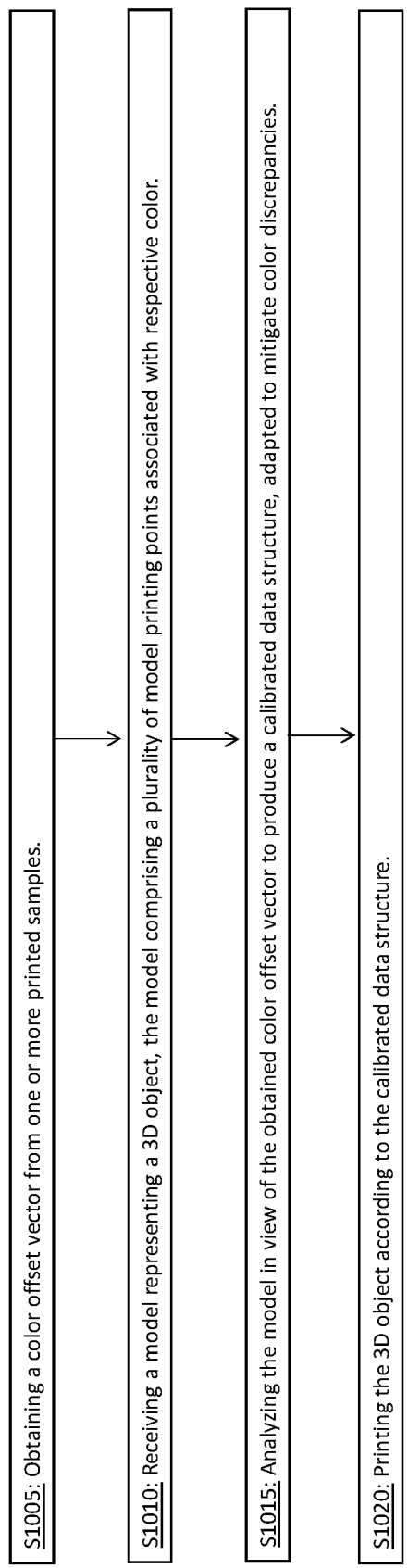
FIG. 18 is a flow diagram depicting a method of mitigating, by at least one processor, color discrepancies in a 3D printing system comprising a plurality of printing heads, according to some embodiments.

Reference is now made to FIG. 18, which is a flow diagram depicting a method of mitigating, by at least one processor or controller (such as e.g., element 2 of FIG. 1 and/or element 20 of FIG. 2), color discrepancies in a 3D printing system or machine (e.g., element 300 of FIG. 2) that may include a plurality of printing heads (e.g., element 300B of FIG. 2), according to some embodiments.

As shown in step S1005, processor 20 may obtain a color offset vector from one or more printed samples, as discussed herein (e.g., in relation to FIG. 3A and/or FIG. 3B).

As shown in step S1010, processor 20 may receive (e.g., from an external input device such as element 7 of FIG. 1 and/or element 70 of FIG. 2) a model (e.g., 3D model element 101A of FIG. 2) representing a 3D object. The model may include a plurality of model printing points associated with respective color. For example, model element 101A may include a plurality of shell data elements, 101A-1, each including a plurality of shell printing points, and one or more (e.g., all) of the shell printing points may be associated with a color, as elaborated herein (e.g., in relation to table 3).

As shown in step S1015, processor 20 may analyze (e.g., by analysis module 30 and calibration module 40 of FIG. 2) the model in view of the obtained color offset vector to produce a calibrated data structure (e.g., elements 41A, 41B of FIG. 2), adapted to mitigate color discrepancies, as elaborated herein (e.g., in relation to FIG. 2 and/or FIG. 17).

As shown in step S1020, processor 20 may initiate printing of the 3D object according to the calibrated data structure. For example, processor 20 may propagate the calibrated data structure to 3D printing system, which may in turn print a 3D object according to the calibrated data structure.

As elaborated herein, embodiments of the present invention provide a practical application for printing 3D objects that may be devoid of apparent color discrepancies As elaborated herein, embodiments of the present invention may provide an improvement over state-of-the-art systems for printing 3D printing objects by implementing methods of mitigating color discrepancy and enhancing color uniformity on edges or faces of 3D printed objects.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of mitigating, by at least one processor, color discrepancies in a three-dimensional (3D) printing system comprising a plurality of printing heads, the method comprising:
    obtaining a color offset vector from one or more samples;
    receiving a model representing a 3D object, the model comprising a plurality of model printing points associated with respective color;
    analyzing the model in view of the obtained color offset vector;
    producing a calibrated data structure, adapted to mitigate color discrepancies, wherein producing the calibrated data structure comprises modifying the plurality of model printing points to comprise one or more of a transparent envelope region, a clarity enhancement region, a color compensation region and a white region; and
    printing the 3D object according to the calibrated data structure.

2. The method according to claim 1, wherein producing the calibrated data structure comprises defining the transparent envelope region comprising a plurality of printing points associated with a clear printing material, on an external surface of the model.

3. The method according claim 1, wherein producing the calibrated data structure comprises:

calculating a compensated color ratio between two or more colors; and defining a color compensation region, comprising a plurality of printing points, associated with the two or more colored materials at the compensated color ratio.

4. The method according to claim 1, wherein producing the calibrated data structure comprises:

calculating an enhanced clarity ratio between a clear material and one or more colored materials; and defining the clarity enhancement region, comprising a plurality of printing points, associated with one of the clear material and colored materials at the enhanced clarity ratio.

5. The method according to claim 1, wherein producing the calibrated data structure further comprises defining the white region comprising a plurality of printing points of white color material, in a location adjacent to the clarity enhancement region.

6. The method according to claim 1, further comprising:

producing a plurality of slice elements, corresponding to planar slices of the 3D object, wherein each slice comprises a plurality of slice printing points, and wherein each slice printing point is associated with a color of the calibrated data structure; and for one or more slice printing points, applying a dithering algorithm on the calibrated data structure, to obtain a dithered value, and wherein printing the 3D object further comprises selecting, for one or more slice printing points, a printing head, based on the dithered value.

7. The method according to claim 1, wherein at least one sample of the one or more samples is a 3D sample, comprising a plurality of flat surfaces at specified spatial orientations, and wherein obtaining a color offset vector comprises:

measuring color of two or more of the plurality of flat surfaces;

calculating a color difference between measured colors; and deriving the color offset from the calculated color difference.

8. The method according to claim 1, wherein at least one sample of the one or more samples comprises a pattern of droplets of colored modeling material, and wherein obtaining a color offset vector comprises:

measuring a location of one or more droplets of the pattern of droplets;

calculating a color droplet misalignment according to the measured locations; and deriving the color offset vector from the calculated droplet misalignment.

9. The method according to claim 1, wherein calculating the compensated color ratio comprises, for one or more printing points of the color compensation region:

receiving a nominal color ratio;

calculating a base color compensation parameter, according to the color offset vector;

calculating a projection of a normal to a surface of the model on the color offset vector; and calculating the compensated color ratio as a function of the base color compensation parameter, the nominal color ratio and the calculated projection.

10. The method according to claim 1, wherein calculating the enhanced clarity ratio comprises, for one or more printing points of the clarity enhancement region:

receiving a nominal clarity ratio;

calculating a base clarity enhancement parameter, according to the color offset vector;

calculating a projection of a normal to a surface of the model on the color offset vector; and calculating the enhanced clarity ratio as a function of the base clarity enhancement parameter, the nominal clarity ratio and the calculated projection.

11. A system for mitigating color discrepancies in a 3D printing system comprising a plurality of printing heads, the system comprising: a non-transitory memory device storing instruction code and a processor associated with the memory device, and configured to execute the instruction code, such that when the processor executes the instructions code, the processor is configured to:

obtain a color offset vector from one or more samples;

receive a model representing a 3D object, the model comprising a plurality of model printing points associated with respective color;

analyze the model in view of the obtained color offset vector to produce a calibrated data structure, adapted to mitigate color discrepancies by modifying the plurality of model printing points to comprise one or more of a transparent envelope region, a clarity enhancement region, a color compensation region and a white region; and propagating the calibrated data structure to the 3D printing system so as to print a 3D object according to the calibrated data structure.

12. The system according to claim 11, wherein the processor is further configured to produce the calibrated data structure by defining a transparent envelope region comprising a plurality of printing points associated with a clear printing material, on an external surface of the model.

13. The system according to claim 11, wherein the processor is further configured to produce the calibrated data structure by:

calculating a compensated color ratio between two or more colors; and defining the color compensation region, comprising a plurality of printing points, associated with the two or more colored materials at the compensated color ratio.

14. The system according to claim 11, wherein the processor is further configured to produce the calibrated data structure by:

calculating an enhanced clarity ratio between a clear material and one or more colored materials; and defining the clarity enhancement region, comprising a plurality of printing points, associated with one of the clear color and the one or more opaque colors at the enhanced clarity ratio.

15. The system according to claim 14, wherein the processor is further configured to calculate the enhanced clarity ratio for one or more printing points of the clarity enhancement region by:

receiving a nominal clarity ratio;

calculating a base clarity enhancement parameter, according to the color offset vector;

calculating a projection of a normal to a surface of the model on the color offset vector; and calculating the enhanced clarity ratio as a function of the base clarity enhancement parameter, the nominal clarity ratio and the calculated projection.

16. The system according to claim 11, wherein the processor is further configured to produce the calibrated data structure by defining a white region comprising a plurality of printing points of white color, in a location adjacent to the clarity enhancement region.

17. The system according to claim 11, wherein the processor is further configured to:
- produce a plurality of slice elements, corresponding to planar slices of the 3D object, wherein each slice comprises a plurality of slice printing points, and wherein each slice printing point is associated with a color of the calibrated data structure; and
- apply, for one or more slice printing points, a dithering algorithm on the calibrated data structure, to obtain a dithered value.

18. The system according to claim 11, wherein at least one sample of the one or more samples is a 3D sample, comprising a plurality of flat surfaces at specified spatial orientations, and wherein the processor is further configured to obtain a color offset vector by:
- measuring color of two or more of the plurality of flat surfaces;
- calculating a color difference between measured colors; and
- deriving the color offset from the calculated color difference.

19. The system according to claim 11, wherein at least one sample of the one or more samples comprises a pattern of droplets of colored modeling material, and wherein the processor is further configured to obtain a color offset vector by:
- measuring a location of one or more droplets of the pattern of droplets;
- calculating a color droplet misalignment according to the measured locations; and
- deriving the color offset vector from the calculated droplet misalignment.

20. The system according to claim 11, wherein the processor is further configured to calculate the compensated color ratio for one or more printing points of the color compensation region by:
- receiving a nominal color ratio;
- calculating a base color compensation parameter, according to the color offset vector;
- calculating a projection of a normal to a surface of the model on the color offset vector; and
- calculating the compensated color ratio as a function of the base color compensation parameter, the nominal color ratio and the calculated projection.

* * * * *